US006195345B1

(12) United States Patent
Kramer

(10) Patent No.: US 6,195,345 B1
(45) Date of Patent: Feb. 27, 2001

(54) HIGH CAPACITY MULTIMEDIA MESSAGING EXCHANGES

(75) Inventor: Philip Kramer, Karlskrona (SE)

(73) Assignee: Ericsson Messaging Systems, Inc., Woodbury, NY (US)

( * ) Notice: Subject to any disclaimer, the term of this patent is extended or adjusted under 35 U.S.C. 154(b) by 0 days.

(21) Appl. No.: 09/001,414

(22) Filed: Dec. 3, 1997

(51) Int. Cl.[7] .................................................. H04L 12/66
(52) U.S. Cl. .......................................... 370/352; 379/220
(58) Field of Search ..................................... 370/400, 352, 370/270, 254; 379/219, 220, 226, 227, 88.17, 93.01; 709/219, 238, 240, 241; 348/6, 12; 455/6.1, 5.1

(56) References Cited

U.S. PATENT DOCUMENTS

| 4,723,238 | 2/1988 | Isreal et al. . |
| 5,193,110 | 3/1993 | Jones et al. . |
| 5,325,423 | 6/1994 | Lewis . |
| 5,333,266 | 7/1994 | Boaz et al. . |
| 5,365,524 | 11/1994 | Hiller et al. . |
| 5,371,852 | 12/1994 | Attanasio et al. . |
| 5,497,373 | * 3/1996 | Hulen et al. .............................. 710/1 |
| 5,524,137 | 6/1996 | Rhee . |
| 5,528,281 | 6/1996 | Grady et al. . |
| 5,577,105 | 11/1996 | Baum et al. . |
| 5,761,500 | * 6/1998 | Gallant et al. .......................... 707/10 |
| 5,892,968 | * 4/1999 | Iwasaki et al. .......................... 710/1 |
| 5,905,879 | * 5/1999 | Lambrecht ........................... 710/117 |
| 6,038,296 | * 3/2000 | Brunson et al. ................. 379/100.11 |

OTHER PUBLICATIONS

"Ericsson's MXE—Multimedia Messaging for PCS," Ericsson Messaging Systems, Inc., 1995 (Various Brochures).

* cited by examiner

Primary Examiner—Chi H. Pham
Assistant Examiner—Brenda H. Pham
(74) Attorney, Agent, or Firm—Nixon & Vanderhye P.C.

(57) ABSTRACT

A multimedia messaging system for use in providing voice mail, fax mail, e-mail, notification services, etc. over telephony lines is disclosed in which the system is adaptable for clustering to a single telephony-equipped switch. Multiple back-end systems can be added to the single telephony equipped switch such that the back-end machines operate the same as they would in stand-alone mode, thus making the cluster transparent to the back-end machines.

30 Claims, 14 Drawing Sheets

| ORIGINAL NO. | TOTAL | HIGH-ORDER | LOW-ORDER |
|---|---|---|---|
| 00010 | 5 | 000100000 | 000000000 |
| 0020000 | 7 | 002000000 | 000000000 |
| 010 | 3 | 010000000 | 000000000 |
| 0777 | 4 | 077700000 | 000000000 |
| 07770 | 5 | 077700000 | 000000000 |
| 077700 | 6 | 077700000 | 000000000 |
| 1234 | 4 | 123400000 | 000000000 |
| 55555 | 5 | 555550000 | 000000000 |
| 60000 | 5 | 600000000 | 000000000 |
| 7 | 1 | 700000000 | 000000000 |
| 777 | 3 | 777000000 | 000000000 |
| 9 | 1 | 900000000 | 000000000 |
| 900000000012 | 13 | 900000000 | 001200000 |
| 900000001 | 10 | 900000000 | 100000000 |
| 9000000012 | 11 | 900000000 | 120000000 |

Fig. 13

HIGH CAPACITY MULTIMEDIA MESSAGING EXCHANGES

FIELD OF THE INVENTION

This invention relates to telecommunications networks and in particular to multimedia messaging systems employed over communication networks in which the multimedia messaging systems are clustered for higher capacity.

BACKGROUND OF THE INVENTION

Multimedia messaging systems are commercially available for such applications as voice mail and short message services over fixed telephone, radio telephone, paging and other types of communications networks. One such commercially available multimedia messaging system is the so-called MXE system manufactured by the present assignee. Throughout this specification, where reference is made to Ericsson's MXE system, that term shall mean either the commercially available Ericsson MXE system or such other multimedia messaging systems as may be available.

Traditionally, multimedia messaging systems are available with voice mail, fax mail, e-mail, notification services, short message services (alphanumeric messages displayed on mobile phones), and other customized services for the subscriber. The multimedia messaging system is the hardware and software that provides the infrastructure for these messaging applications across all types of telecommunications networks, such as fixed, cellular, private, paging, personal communication services (PCS), etc.

Multimedia messaging systems communicate with the network via multimedia interfaces (MMIs). An example multimedia interface (MMI) supporting present messaging applications for multimedia messaging systems is disclosed, for example, in Hulen et al., U.S. Pat. No. 5,497,373, which is incorporated herein by reference.

The MXE, like other multimedia messaging systems, supports a limited number of subscribers. This is due to at least three inherent bottlenecks in the system, namely the DMA transfers (i.e., the playing of voice prompts and the recording of voice messages), the ability to keep up with a remote telephony subsystem, and the disk access (such as subscriber lookups and message storage/retrieval). These bottle-necks are in fact the normal types of bottlenecks that you would expect to see on a system of this type, for example, on a system built around a single off-the-shelf UNIX workstation.

The multimedia messaging system, from the subscribers' view, provides personalized communications available in a variety of different formats to permit the subscriber to access messages in a variety of different ways. For example, when subscriber may otherwise be out of reach of traditional telephone systems, using the multimedia messaging system, others can leave voice messages, send faxes, or send e-mail to the subscriber via the multimedia messaging system which automatically notifies the subscriber that messages are waiting. When it is convenient, the subscribers then call a single number to retrieve all of the messages.

From the network perspective, the multimedia messaging system provides integrated messaging services to market to the subscribers, provides a single platform for developing additional services to provide to the subscribers, and enhances revenue streams by increasing call completion ratios.

Demand for multimedia messaging systems services is increasing, causing the bottlenecks inherent in multimedia messaging systems to become increasingly significant. It therefore becomes necessary to add additional multimedia messaging systems to existing ones. This is traditionally done by adding systems containing sophisticated signaling interfaces to the telecom environment. One such example system is the so-called "LNX" manufactured by Excel, Inc. of Massachusetts. The LNX is a physical box having ports and a cage of circuit boards providing the interfacing to the telecom environment through an additional controller software module (sometimes referred to as an "LNX controller"). In this disclosure, the terms "LNX" and "LNX Controller" should be interpreted to broadly refer to sophisticated interfacing equipment whether marketed under the "LNX" name or not. In any event, expanding system capacity by adding new LNX boxes can be rather expensive and inefficient.

It thus becomes important to be able to add capacity to an existing multimedia messaging system, without the expense of additional telephony-equipped workstations.

SUMMARY OF THE INVENTION

By providing the ability to configure the multimedia messaging systems, it becomes possible to cluster the multimedia messaging systems in order to increase capacity of the system as a whole, without incurring the expense of adding telephony-equipped workstations. An example clustered system configuration consists of a single front-end machine which is "telephony-equipped" together with any number of back-end machines that do not have the otherwise necessary telephony switching equipment. Additional front-end machines are optional and can be effectively employed in accordance with the present invention to increase capacity still further, as described in greater detail below. The practical limit on the number of back-end machines would be based simply on the processing capabilities of the front-end machine, which can vary. In a preferred example, described below, three back-end machines communicate with one front-end machine.

The present invention provides a number of outstanding merits. First, the clustering arrangements (including the multiple clustering arrangement) provide nearly unlimited capacity for the multimedia messaging system. In addition, the separation of the real telephony-equipment (i.e., the controlling of the remote subsystem) from the messaging applications, results in a simplified system that becomes easier to support and upgrade. Still further, the present invention offers the customer the ability to expand their system capacity on an as-needed basis and with minimal risk. The present configuration also provides an environment which can be used for cost effective testing. The present invention further provides the possibility of networks of multi-vendor messaging systems having a common access number. Thus, the multimedia service referred to by the present invention can be any messaging service from simple voice mail applications to high band width applications, such as video-on-demand.

BRIEF DESCRIPTION OF THE DRAWINGS

Other advantages and objects of the present invention will be described in detail with reference to the accompanying drawings, in which:

FIG. 13 is an example mailbox table from a front-end lookup-table in accordance with an example embodiment of the present invention.

DETAILED DESCRIPTION OF THE PRESENTLY PREFERRED EMBODIMENTS

The present system is based on a concept that allows for cost-effectively increasing the performance and capacity of a single messaging node by creating a cluster of nodes that appear, from the network's point of view, to be a single high-capacity system providing single number access. Of equal importance, however, is that each individual node of the cluster operates as a stand-alone system. This allows a single software image to exist for all machines.

The present system is built upon the concept of a "virtual" channel, and the idea of a "front-end" node that can, using these virtual channels, switch a call to any one of several back-end machines.

Figure 1:
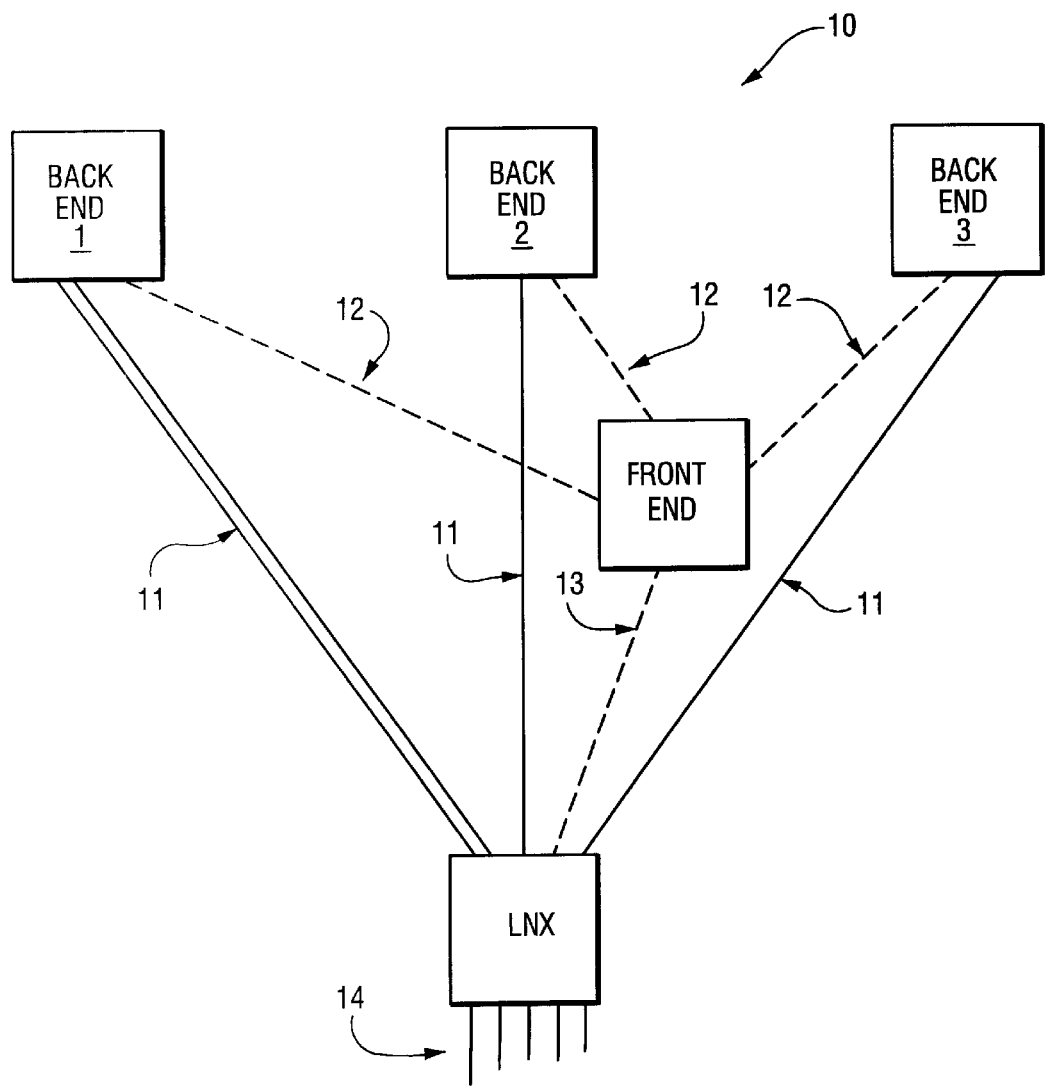
FIG. 1 is a schematic diagram of an example embodiment of the present invention.

FIG. 1 illustrates an example embodiment of such a system. In essence, this example cluster 10 includes four MXEs (back-end 1, back-end 2, back-end 3 and front-end) and a single node used to provide the signal interfacing to the telecom environment (which may be in the current environment the "LNX" box and software described previously). Each of the back-end MXEs is connected to the LNX via real MMI channels 11. The LNX in turn, is connected to the communication network via network channels 14. Without the clustering arrangement, a single MXE would ordinarily receive messages from the LNX referring to real network channels. But, in the present example, the capacity of the system is increased by providing three back-end systems (instead of just one), which are coordinated by the front-end system.

Each of the back-end MXEs communicate with the front-end via virtual channel signaling links 12 between each of the respective back-ends and the single front-end. The virtual channel signaling links between the back-end and the front-end carry information about the virtual channels (and carry subscriber lists, as discussed in more detail below). Although the back-ends are allocating the MMI channels, the front-end will allocate the virtual channels identified in the virtual channel signaling links 12. The front-end then communicates with the LNX controller via the real network signaling link 13, which carries information about real network channels (and carries an LNX software image). In this way, the front-end provides a translation from the virtual channels identified via the virtual channel links 12 to the real network channels and instructs the LNX to cross-connect the real MMI channels with the network channels based on this translation and instructions from the back-end.

Each back-end MXE will have associated with it a list of subscribers that reside on the respective back-end machine. This list of subscribers must be communicated to the front-end and is therefore transferred over the signaling links 12 to the front-end machine where they are loaded into a lookup-table. This lookup-table allows the front-end machine to translate the virtual channels to the real network channels for the respective subscribers. The lists of subscribers from the back-end machines are transferred in the same way that a software image is transferred to the LNX. That is, in all respects, the back-ends operate just as though they were talking to the LNX in the normal fashion, thus preserving the transparency of the cluster.

Each of the signaling links 12 between the back-ends and the front-end will have corresponding groups of the virtual channels discussed previously. These virtual channels don't really exist to the extent that they have physical circuits. Instead, these channels are given to the back-end machine to allow the back-end machine to think such channels exist between the LNX and the network via the real network channels 14. This allows the back-end machines to preserve a single image of the software, just as though the back-end machine was used as a stand-alone MXE. As a result, to create the present cluster, no new development is necessary for any of the back-end machines, because they continue to operate just as though they were in a stand-alone mode. In the end, it is the front-end machine which translates the virtual channels to the real network channels and instructs the LNX via the real network signaling link 13 accordingly. At this point virtual channels communicated on link 12 have been translated to real network channels 14. The LNX then cross connects the MMI channels 11 with the real network channels 14.

1. TELEPHONY CHANNEL CONFIGURATION

Two databases employed by the example embodiment of the present invention are the Telephone Controller (TCR) database, and the Telephony Channel (TCH) database. An entry in the TCH database can be viewed as the intelligence of a port that a call would originate or terminate on, meaning each TCH entry can include a storage location containing the definition for the signaling used, instructions on how the call should be processed, etc. An entry in the TCR database would be the parent controller of a group of telephony channels, meaning the processor that executed the software required by the telephony channel.

2. MXE MODULARITY AND SYSTEM OVERVIEW

Figure 2:
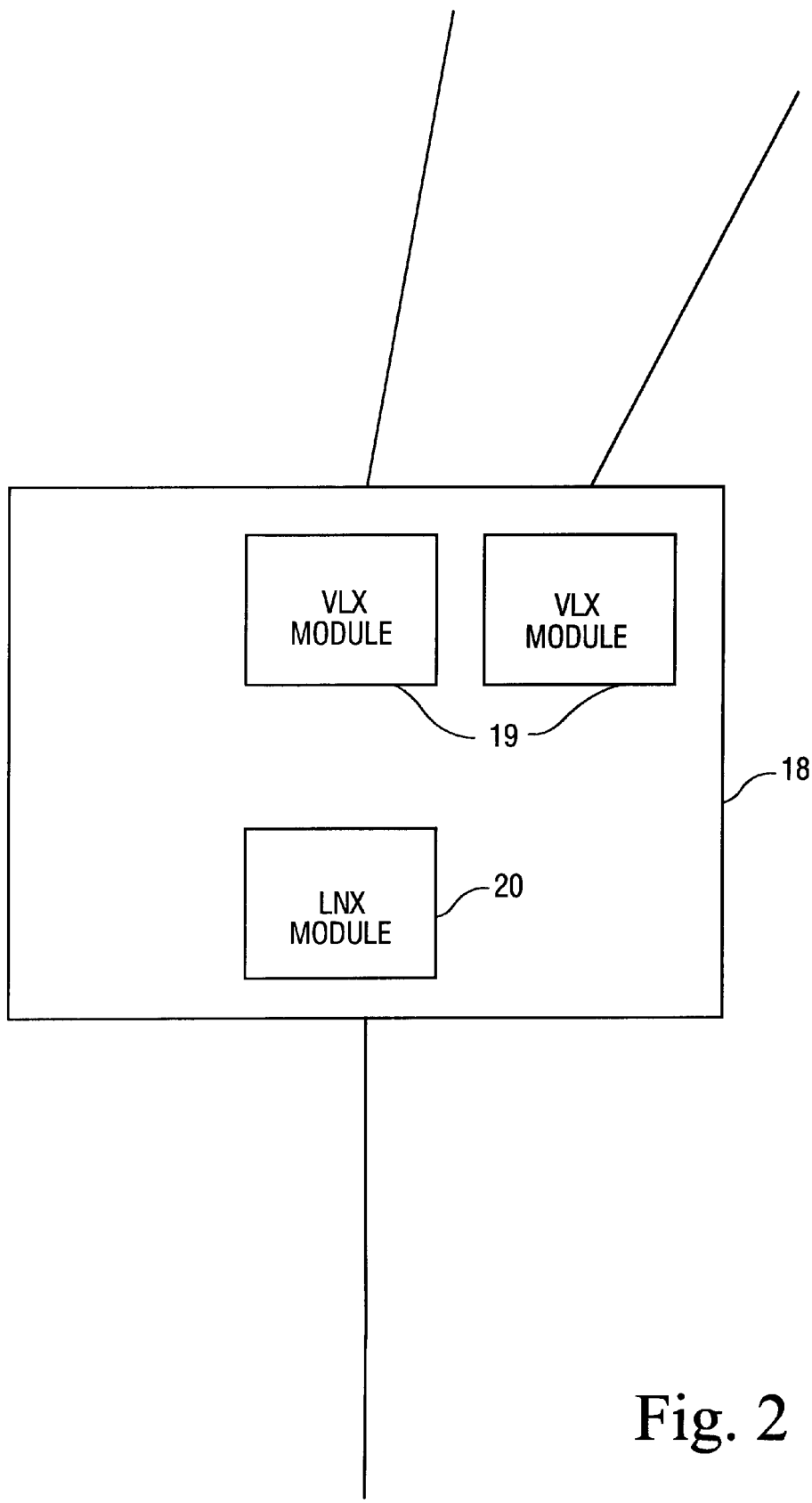
FIG. 2 is a schematic block diagram of an example front-end in accordance with the present invention.
Figure 5:
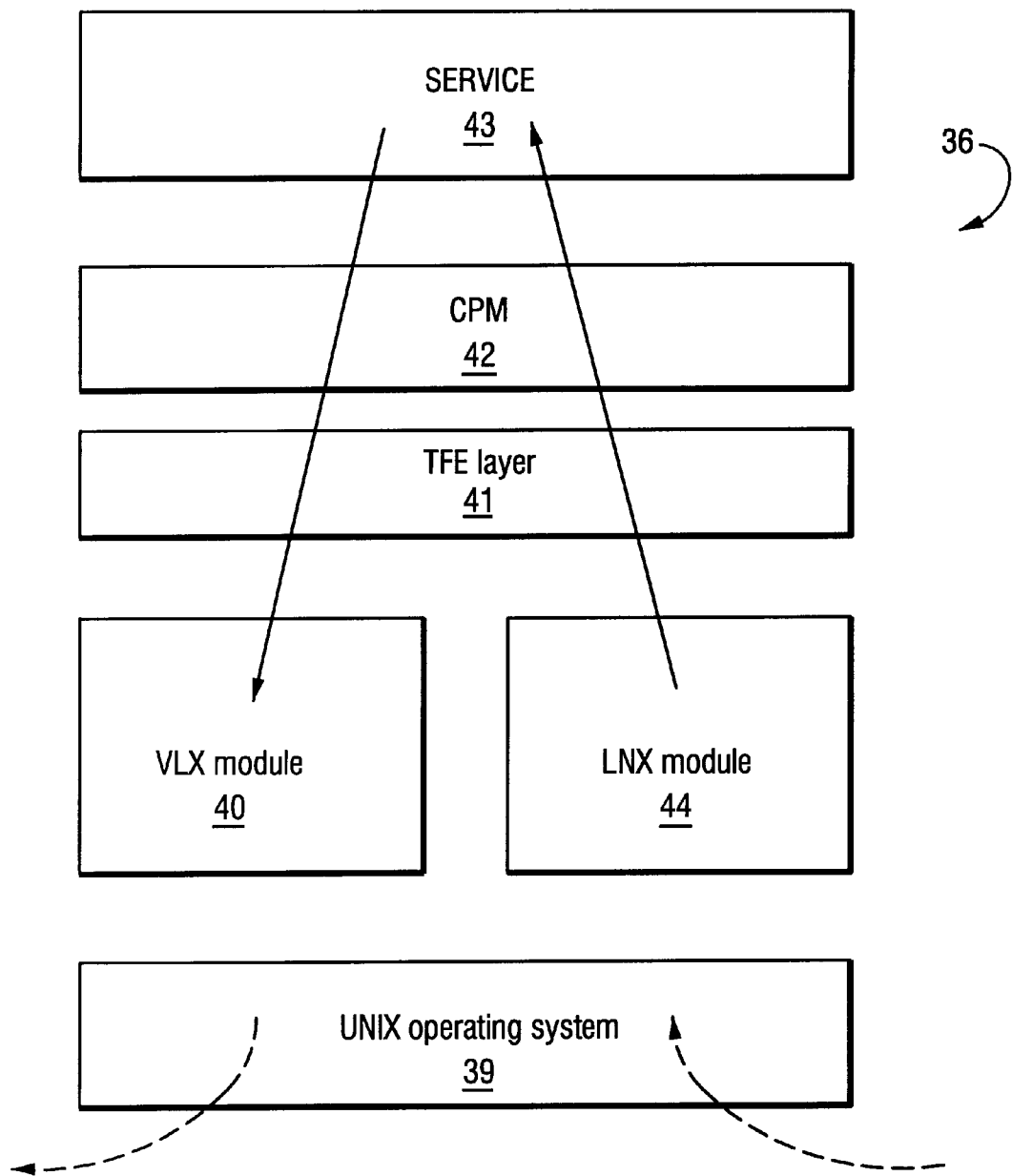
FIG. 5 illustrates the communication paths between the VLX and LNX structures in accordance with an example embodiment of the present invention.

The base component employed in both the front-end and back-ends of the clusters in the example embodiments is the MXE (18 in FIG. 2). One could view the MXE from a very high level as consisting of several layers of software. The lowest layer, for example, could be a UNIX operating system 39 (FIG. 5) or equivalent, and the layer above the operating system could be a transactional processing software package (such as the Encina package or equivalent). The MXE application, itself consisting of several layers, would then sit on top of the Encina package. Although this is perhaps an over-simplified model of the MXE, it is relevant and effective in simplifying the system for a clearer understanding of the concept behind the High Capacity MXE (the clustered MXEs).

Two important software modules that are included in the MXE 18 are the so-called VLX module (Virtual Line eXchange) and the LNX module. The LNX software module, where used in this disclosure will "think" it is communicating with a physical LNX even though it may in some described instances be communicating with a VLX module 19 instead. In the preferred embodiment of the invention, each back-end machine has a standard LNX software module 20 for communication with the front-end machine 18 dedicated VLX module 19, used to replace the actual LNX that the back end believes it is communicating with. Just as described previously with respect to in FIG. 1, the back end machine continues to provide message data to the network via the physical LNX box via the MMI channels 11.

The VLX controller, which is a configurable software module, sends and receives messages to and from a specific port. By configuring a controller for each back-end machine (a physical port), hunt groups can be established and calls can be forwarded to the back-end machine where the subscriber mailbox is located. Since the back-end machines would not even know that the "telephony message" was sent by a switching server, this front-end machine is referred to herein as a "virtual line exchange."

In order for the front-end to be able to connect to any multimedia message system back end machine, regardless of software revision, it should be possible to read messages containing the list of subscribers. Ideally, these messages should be compressed to shorten the download time.

In the layers of software that define the call-processing application and platform of the MXE, at least four levels exist. This is shown, for example, for MXE 36 in FIG. 5. At a low level, a layer of software is responsible for providing the functions that typically require hardware support. This layer of software, however, is divided into several software modules, each of which defines a telephony controller. One such telephony controller would be the LNX which is responsible for doing various types of line and register signaling, DTMF detecting, and circuit switching. The LNX software module 44 then would be the software and protocol required for controlling and communicating with the LNX, the actual LNX being a remote system (as shown, for example, in FIG. 1). Above this layer is a layer of software, called the telephony front-end (TFE) layer 41, which is designed to keep these different telephony controller software modules independent of layers above. The telephony controllers and the telephony channels would in fact belong to this TFE layer, since it is necessary to have a uniform definition for all such data structures. The telephony channel manager (TCM) and call-processing manager (CPM) layers 42, above the TFE layer 41, would then define the platform that an MXE service 43 would use. i.e., a voice-mail service.

The above-described three MXE software layers (including the application layer) and four application software layers (including the LNX and TFE layers) make up the back-bone MXE components that will be clustered in accordance with the present invention.

One component used to expand the current system and form the cluster is the software module referred to as the VLX controller 40. This software module exists on the same plane as that of the LNX module described above. By viewing these software modules from a 3-dimentional perspective, the LNX module could be imagined as facing towards the network, with the VLX module facing towards the back-end. There would, however, be multiple instances of the VLX controller, one for each back-end machine.

Figure 6:
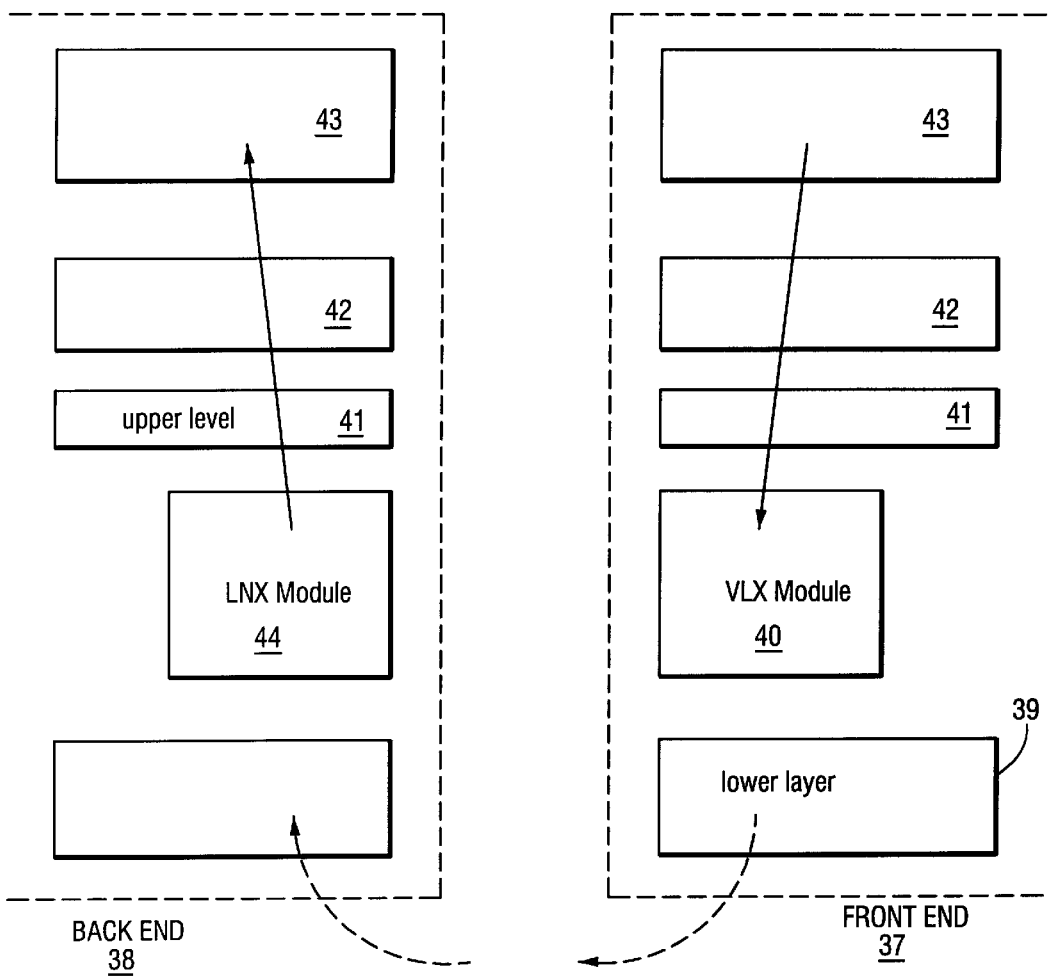
FIG. 6 illustrates the functional layering of an example MXE in accordance with the present invention.

This VLX software module 40 forms a peer-to-peer protocol with the LNX module on the back-end machine, as shown in FIG. 6. The VLX module 40, therefore, can be seen as a mirror-image of the LNX module 44, containing within it's protocol command set, the messages that the back-end LNX module 44 will expect to receive, including the responses to the commands that the back-end can send.

Figure 3:
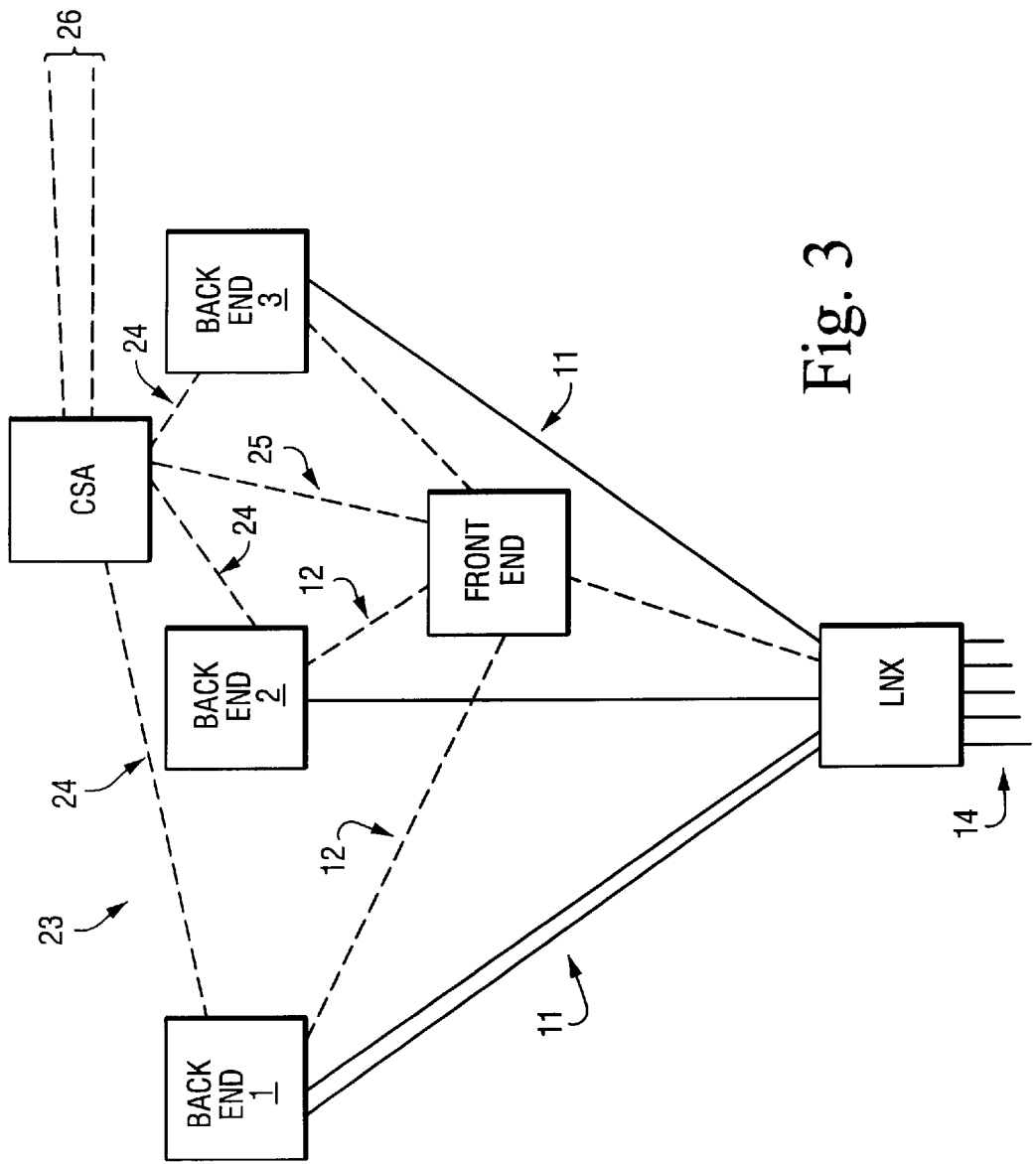
FIG. 3 is an alternative example embodiment of the present invention showing a circuit switch access to other clusters.

The present system forms, in effect, a common-channel signaling network of MXE nodes, where the LNX itself is considered to be a node that sits in front of the front-end MXE 37 (see also LNX and Front End of FIGS. 1 and 3). Since the back-end MXEs 38 still think that they are physically connected to the "real" LNX, and that they are operating the same as they would be were they still connected to it, then the front-end 37 in some respects can be seen as a Signaling Transfer Point (STP). The difference, however, between this node 37 and a true STP, is the fact that the signaling information to the front-end 37 is passed up to an application to determine which back-end machine 38 to continue routing the call to. Whereas an STP would transfer signaling information from a lower protocol layer (and unconditionally), the front-end system acts more like a true network exchange.

It is important to emphasize the master/slave relationship between the MXE 38 and the LNX 44, with the MXE acting as the master. This is of course true, regardless of whether the MXE is acting as the front-end to a cluster of back-end machines, or it is simply a stand-alone system. Whereas the LNX is more commonly thought of as an integrated component of the commercially available MXE, the two entities can be thought of as independent of each other when describing the High Capacity MXE.

Within the VLX software module, there exists an active and a standby lookup-table. These tables contain, in ascending alpha-numeric order, the list of subscribers that are on the back-end machine that this module corresponds to. The entries of these lookup-tables consist of a three integer encoding of the subscriber id/mailbox, which allow for efficient storage and access.

In addition to the introduction of this new VLX module for the purpose of clustering together more than one machine, an additional object has been defined, which is common to all VLX controllers (note that the VLX controller is an instance of the VLX software module). This object is a master lookup-table (actually an active and a standby tables), similar in structure to the VLX lookup-table, but dimensioned in size for the aggregate of all back-end machines. This table exists within the TFE layer, so that global access to the application is provided. One distinguishing feature between this table and that of the VLX, is that there exists within each entry, a value identifying the back-end machine which the subscriber resides on.

Figure 7:
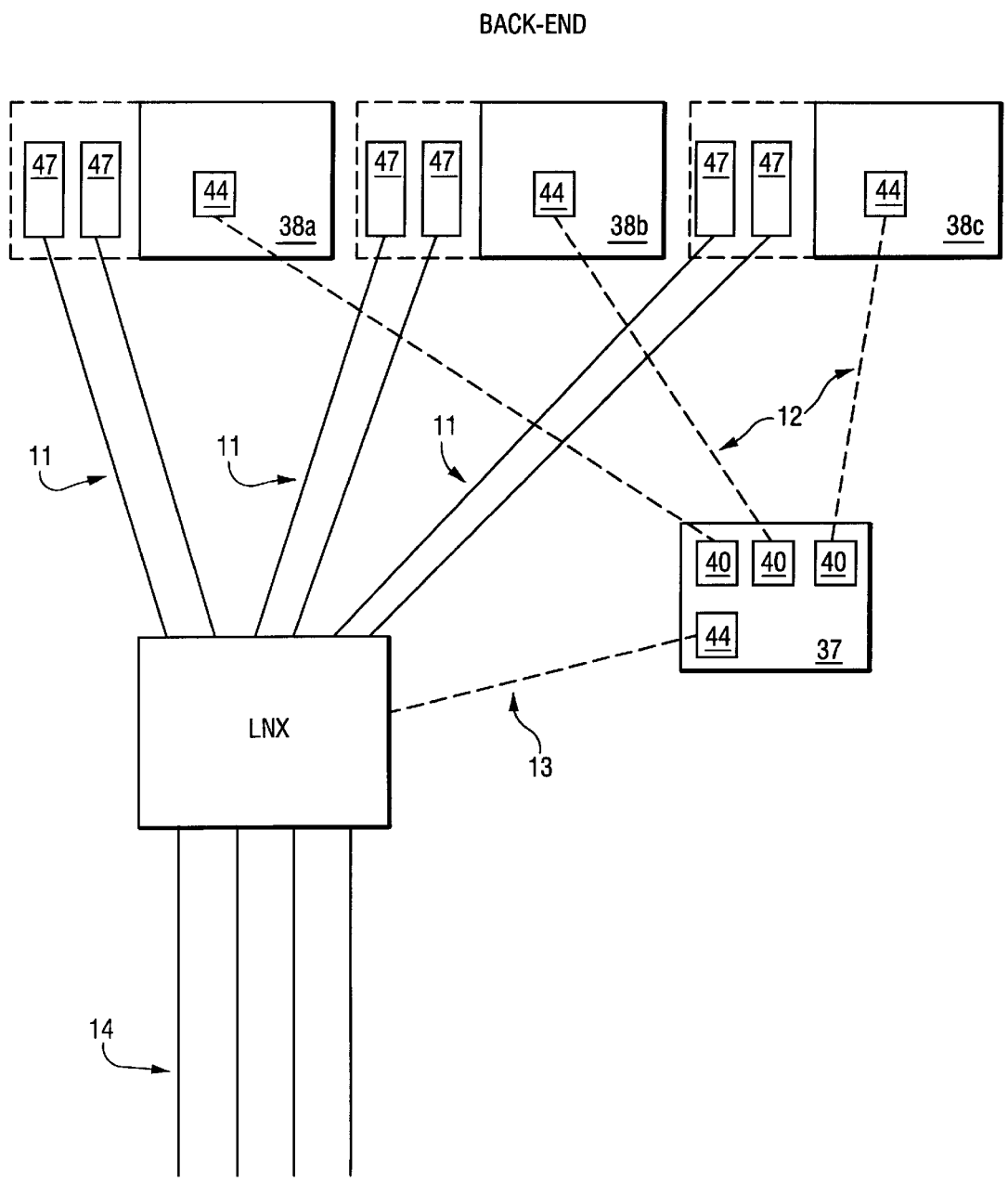
FIG. 7 is an example cluster in accordance with the present invention.

An example installation of the High Capacity MXE clustered in accordance with the present invention is now described in detail with respect to FIG. 7, both in terms of the physical installation and of the migration from a single machine to a cluster of four machines.

The network of FIG. 7 consists of both a common-channel signaling network and a switching network. The signaling information is used to control the switching network. In FIG. 7 (as in FIGS. 1, 3, 4, 5 and 8), the voice trunks are shown as solid lines and signal links are shown as dashed lines. Nodes are shown as 38a through 38c and 37, with node 37, for example, including LNX module 44 and VLX modules 40. Nodes 38a through 38c each contain two MMIs 47 and a single LNX software module 44. Node 37 corresponds to the previously discussed front end and nodes 38a through 38c correspond to the back-end.

The front-end acts as a gateway between the messaging network and the outside world. The signaling to the outside world is therefore independent of the messaging network and the back-end. This gateway functionality is defined by the switching service.

During normal system operation a call will be reported via signaling link to LNX module 44. This call information will launch a new service thread on node 37. If we assume that the service thread selects a VLX module 40 for transferring the call to back-end 38b, newly generated call information will be sent over signaling link and will result in this call information being received by LNX module 44 of MXE 38b. A dialogue between node 37 and the LNX will be established, as well as a dialogue between node 37 and node 38b. If we assume that the voice-mail service running on node 38b will select an MMI channel 47 on the fourth MMI (from the left of FIG. 7), the request to connect this channel will be sent over signaling link 11 connecting this MMI to the LNX, which will result in a new request to connect the channel being sent over signaling link 13. This will result in a direct connection between the LNX and node 38b using voice trunk 11 connecting the appropriate MMI 47 to the LNX of MXE 38b.

Before a high-capacity expansion, a single standard configuration MXE machine 38a is installed having four E1 PCM links used for voice-mail and a single C7 link used for short message service (SMS). Three additional MXE machines (38b, 38c, and 37) is then placed with the existing MXE system 38a. These new machines consist of the front-end 37 and two additional back-end machines 38b and 38c.

The next configuration issue is that of the TCH database. But first, one must understand how all of the PCM links are physically connected. In general, there is a set of links 14 going from the network to the LNX, and a set of links 11 going from the LNX to the MMIs 47. In the above installation example, there are 10 links going to the network, and 12 links going to the MMIs (although all are not shown). Note that the MMIs 47 of a High Capacity MXE are only on the back-end machines 38a–c, and that the LNX is only controlled by the front-end machine 37. So the PCM links going to the MMI boards 47 that are only on the back-end machines 38a–c are connected to the LNX which is only controlled by the front-end machine 37.

These are managed as described below. Assume that the existing stand-alone machine 38a with a standard configuration has PCM links identified by id. nos. 0, 1, 4 and 5 (PCM link identifiers are used by the application to manage the PCM links) configured for going to the network, and PCM link identified by id nos. 2, 3, 5 and 7 configured for going to the MMIs 47. Nothing has been changed on this stand-alone machine in terms of the TCH configuration. For the three new machines (38b, 38c), however, there is one important change to the TCH configuration. The PCM links going to the MMIs (that is, the identifiers) must be mutually exclusive between each back-end machine 38a–c. This is to say that no port on the LNX can be occupied by more than one machine. So to ensure this, the next rule should be observed: The TCR and TCH databases (see "Telephony Channel Configuration" section above) will be the same for all back-end machines, except for the values specifying the PCM link id nos. In a typical embodiment PCM link ids 0 through 7 would be allocated for the first machine, span id's 8 through 15 for the next machine, and so on. Whereas the span (or facility), which is defined in the TCR database, must be unique between all back-end machines, any reference to a physical port does not need to be unique. These values now becomes dummy values as they are no longer relevent.

So, a configuration requirement for the new MXE machines is:
 Create TCR and TCH databases for each back-end machine, such that all span id's are unique.

The MMI channels are selected and the circuit switching is performed between the front-end and back-end machines as described below. A common-channel signaling network exists between the MXE nodes and the LNX, which in this example embodiment consists of RS-232 links. Of course, other link standards are possible. Below this signaling network then, is a second level of voice trunks that are controlled by the signaling network. These are the PCM links going from the network to the LNX, and from the LNX to the MMIs. The PCM links going to the MMI boards are, in what is almost a literal sense, what "tie" the High Capacity MXE together. Since the telephony channels (e.g., on line 11) on the LNX side are what terminate the telephony channels on the MMI side, it should be clear that the back-end "owns" the MMI channels, but that the front-end "owns" the LNX channels. In this way, each machine has the same channel identifier yet the back end "thinks" its the only machine in the system and "thinks" its talking to an LNX on channels terminating at an LNX. This is in fact an additional requirement: the front-end machine, as it must configure these LNX channels, must have these entries in its TCH database. But the back-end machines must also contain, in their TCH databases, entries for those channels that are physically connected to it's MMI's. These LNX channels that are defined within the back end machine configuration are, however, not active.

So an additional configuration requirement is:
 Create TCH databases for each back-end machine, such that the LNX/MMI channels are a subset of all LNX/MMI channels of the front-end machines.

The LNX/MMI channels of the front-end machine, therefore, are a superset of all LNX/MMI channels that are distributed over the back-end.

Thus, the above is a formulation of how the telephony channels between the front-end and back-end machines are configured and physically connected according to this one example embodiment. The rationale behind this configuration and how the system operates are described below. As was stated above, the LNX/MMI channels (the LNX channels that go to the MMI's) are shared between the front-end and the back-end. For a typical call, when the MXE needs to play a voice-prompt, for example, it will select an MMI channel, extract the corresponding LNX channel from the TCH record (it is defined as the MMI's auxiliary channel), and then instruct the LNX to connect this B-channel to the channel that's going to the network. In the case of a clustered system then, the only difference is that when the back-end machine "thinks" it's instructing the LNX to perform some operation such as connecting two channels, it is really sending this request to the VLX module of the front-end machine. The front-end machine will then instruct the LNX to connect the channels. The LNX/MMI channel's that are configured by the back-end machine are no longer the active channels. Rather, they are only selected as the B-channels that should be cross-connected, and it is the front-end machine which, after receiving the request from the back-end machine, will reference the corresponding active channel.

At this point, the concept of a "virtual" channel in accordance with the example embodiment of the invention is relevant. Since the "telephony channels" of the MXE are simply an abstraction and are independent of any physical ports, it becomes possible to replace the actual LNX with something completely different, and to keep this change transparent to the application (it has also proven to be quite painless, from a software point of view, to replace the LNX module). In the case of a back-end machine, the LNX is replaced with the VLX. And whereas the back-end machine has a set of telephony channels which it thinks are going out to the network, these channels are in fact going out to the front-end (in a sense, the front-end could be considered the network). For each of these "network" channels then, there is a corresponding "virtual" channel on the front-end machine whose parent controller is the VLX. For an outgoing call attempt that originates on a back-end machine, a seizure to the network channel would be seen as an incoming call attempt on the corresponding virtual channel of the front-end machine. And likewise, an outgoing call attempt to a virtual channel on the front-end machine would be seen as an incoming call attempt on the network channel of the back-end machine. And no physical channels are involved, only messages being sent over the signaling link are involved, Due to the modularity of the system, the user interface has been preserved, and it is still possible to use all of the existing commands to, for example, block traffic or add an additional VLX controller. Blocking traffic is in fact an important aspect of the system. It is possible to both manually block, or receive blocking for a set of virtual channels. If we were, for example, to block the channels from the remote side, i.e., from the back-end machine, then the corresponding virtual channels would be seen as blocked. (This change in virtual channel state could be seen from the front end machine). And if there is an outage on one of the back-end machines, then the corresponding VLX module would detect this condition, and take all virtual channels that go to this machine out of service. This would be done by automatically blocking these channels, after not receiving any response to a pre-determined number of "poll" messages that are periodically generated by the VLX. By blocking the channels to a machine that is no longer in service, it becomes possible to either return a congestion signal to the network, or to select alternative routing by defining such a method in the service of the front-end machine. This traffic scenario will of course be similar for the case when all channels to a particular machine are occupied.

With the above embodiment, the virtual channels going to the back-end are totally independent of the network channels on the front-end. And this independence is very important, as it provides many advantages, such as the ability to replace the network signaling system, (i.e., to use ISUP instead of R2 signaling), or to replace the telephony-front end itself, (i.e., the LNX) without affecting the back-end in any way.

As described previously, the list of subscribers on the back-end machines is transferred to a lookup-table in the front end machine. How the lookup-tables are maintained, how they are populated, and how they are updated is described below. There is a "local" lookup-table for each back-end machine, which is contained within the corresponding VLX module on the front-end machine. And these lookup-tables contain the list of subscribers that are currently residing on the back-end machine. There is also a "master" lookup-table, maintained as a TFE object on the front-end machine, which contains the aggregate number of subscribers for all back-end machines. A local lookup-table will initially be populated from a backup file which can be generated off-line. Once populated, it is updated by messages that are sent over the LNX/VLX signaling link. These messages generated by the back-end machine as a result of the "load" and "start" commands having been issued, either manually or as the result of a scheduled procedure. On an example system, this procedure would be scheduled in intervals of approximately every 2 hours. This means that within 2 hour intervals, the lookup-table(s) on the front-end machine will reflect the changes that may have been made to the back-end subscriber database(s).

This procedure (which only runs on the back-end machines) consists of three steps. The first step is to generate the list of changes that should be made to the lookup-table, the second step is to initiate the load command to actually send the information over the link, and the third step is to initiate the start command to instruct the VLX to do a switchover (set the standby table which was loaded to be the active table).

This first step is referred to as Subscriber Delta Coding (SDC), and is done by the process called SDC. This process will create it's own internal representation of the corresponding active and standby lookup-tables that are on the front-end machine. The active table will be created by reading in data from a backup file, whereas the standby table will be created by reading the subscriber database. Once these two tables have been created, then an algorithm for comparing and encoding the differences between these two tables will be used to generate a list which is then sent to the front-end. As the encoding of this change to the subscriber database contains the range for a block of subscribers, one may think of this method as having two levels of compression. The first level would be to only send the changes to the database (the delta), and the second level would be to send information about blocks of subscribers (it is common for the operator to add blocks of subscribers to the back-end machine). The second and third steps of the present procedure for updating the lookup-table are exactly what is done when one wishes to manually initiate a download of the LNX system software image. It is the "runfile" in the TCR record that specifies the file to be downloaded. This is the same field used to specify a file that contains changes to the subscriber database.

So another configuration requirement is.

Set the "delta" file in the TCR database record for the LNX controller(s) of each back-end machine.

Once the loading of a local VLX lookup-table is complete, and a switchover from the standby to the active table has been made, then the contents of the local lookup-table will be merged into the master TFE lookup-table. Whereas it's possible for the application to access the local lookup-table directly, accessing the master lookup-table instead has a number of benefits. First, there may be a performance improvement above a certain number of back-end machines. Second, by having a master table, it is possibly pre-empt an attempt to add a duplicate subscriber, thereby avoiding administrative difficulties. So by adding the master lookup-table, the integrity of the subscriber mailboxes is preserved by ensuring that an active mailbox never exists on more than one machine, and if a duplicate subscriber is created, an alarm will be generated (as a result of an attempt to merge the duplicate subscriber).

The back-end machines can optionally employ certain other configuration specifications. These requirements are not strictly required by the concept behind the High Capacity MXE, and are only included here for the sake of describing the system in its entirety. The additional options described below are, for example, only for the purpose of reducing the cost and complexity of the system. This feature of the MXE allows the MXE to send notification messages over a LAN, to a designated node acting as the PLMN server.

In the example embodiment, one of the back-end machines is designated as the PLMN server. Since a client/server relationship exists between all back end machines, the clients must know about the server, and the server about each client. The clients must be able to send the notification messages to the server.

This option is only necessary if SMS notification is being used, and only if a single PLMN server is required.

One of the most important aspects behind the concept presented here is the guidelines for configuring a back-end machine so that the back-end machines still "thinks" that it is a stand-alone machine. One additional back-end machine configuration parameter could be employed for a given back-end machine to be able to transfer a call to another machine, for example, in the case where a call has been forwarded to a machine that does not have the necessary subscriber profile. In that case, the capability must exist for that machine to be able to send a signal back to the front-end, telling the front-end to forward the call to the machine that does have the profile. This could be referred to as a "hook-flash" option, since it in some respects mimics the procedure typically found on a PABX. To accomplish this, an additional set of primitives is added to the existing back-end service, and the necessary platform support is added as a patch to the current build. It is necessary then to have a Global Service Parameter (GSP) used to prevent this signal from being sent out, in the case that the machine is acting as a true stand-alone machine.

Having configured the back-end machines, the configuration of the front end machine must then be provided. As was discussed previously, it is necessary to configure a VLX controller for each back-end machine, as well as a set of VLX channels for each of these VLX controllers. As a convention, the VLX controller for the first back-end machine will be called VLX__0, the second controller for the second back-end machine will be called VLX__1, and so on. The corresponding channels then, will be called VXOO__ 00__00 through VX00__00__29 for the first span of controller VLX__0, VX00__01__00 through VX00__01__29 for the second span, and so on. For controller VLX__1 then, VX01__00__00 through VX01__00__29 specify channels for the first span, and VX01__01__00 through VX01__01__29 specify channels for the second span, and so on. As was mentioned previously, these telephony channel and controller configurations are a mirror-image of what is configured for the back-end. You would therefore see the same span id's on both the front-end and back-end. As an easy way of creating this TCR and TCH configuration, one might copy the corresponding configuration files from the back-end to the front-end, then after editing these files, and replacing the names, such as LNX with VLX__0, LNX SPAN 0 with VLX SPAN 0, and LX00__00__00 with VX00__00__00, these new files can then be concatenated with their respective TCR and TCH files, and reloaded onto the front-end.

Concerning the channel configuration, there is a field which must be set correctly. And there is also a corresponding field in the controller record which must be set. These fields are the "hunt group" in the channel record, and the "logical id" in the controller record. These values should be set to unique identifiers, such as "1" for the configuration that corresponds to the first machine, "2" for the second machine, and so on (or some other suitable convention) to ensure, that calls are forwarded correctly. As a final configuration, the correct serial port is specified. For the first VLX controller, a device file is selected, which would physically be connected (with a null modem) to the serial port on the corresponding back-end machine. And for subsequent VLX controllers, the next serial port device files and physical ports are selected.

One further configuration of the front-end machine (and this issue may also affect the back-end machine as well) involves the voice-mail application. The front-end machine is now running an application which is completely different than a voice-mail application. Accordingly, we would otherwise be allocating resources for such things as a voice prompt cache and voice-prompt buffers, so the system must be re-dimensioned accordingly. The front-end machine must therefore be altered to reflect the way in which the system will now use these resources.

In order to switch a call, the switching service (a service that will be developed for the front-end machine) will get a hunt group to select the correct back-end machine. When a call is received on a particular channel, the service will:

a. search through the lookup-tables (each VLX controller will have it's own lookup-table), and b. if the subscriber is found, a hunt group (associated with the controller that the lookup-table belongs to) will be returned.

Based on this hunt group, the service will then initiate an outdial, and the service on the back-end machine will be invoked.

In order to update the front-end machine with the subscriber list of the back-end machine, the subscriber numbers will be sent in the same way that a file containing, for example, an executable image would be sent to a remote system. It will (at least as a default) be the responsibility of the back-end machine to initiate the subscriber download (meaning the transfer of subscriber mailbox numbers that are then stored in a lookup-table in the front-end machine). This is, however, done automatically when the front-end machine is initially brought up (just as it is done with the telephony subsystem). As there will be both an active and a standby table, an update to the subscriber list will be made to the standby side, and a switchover will be made from active to standby following the reload.

3. SYSTEM CUT-OVER

The example embodiment also takes into account system cut-overs. For the actual cut-over, depending on whether the LNX is pre-configured, i.e., if we are using a new LNX, the down-time could be in the order of a few seconds. This time would be only the time it takes to block traffic, move the "live" PCM links from the old to the new LNX, and then re-connect the serial port of the existing machine (which is still live) to the serial port on the front-end machine. If the same LNX is used, the down-time will still be minimal, but would include the time to add the additional line cards to the live system and bring the additional facilities into service following the cut-over.

Figure 8:
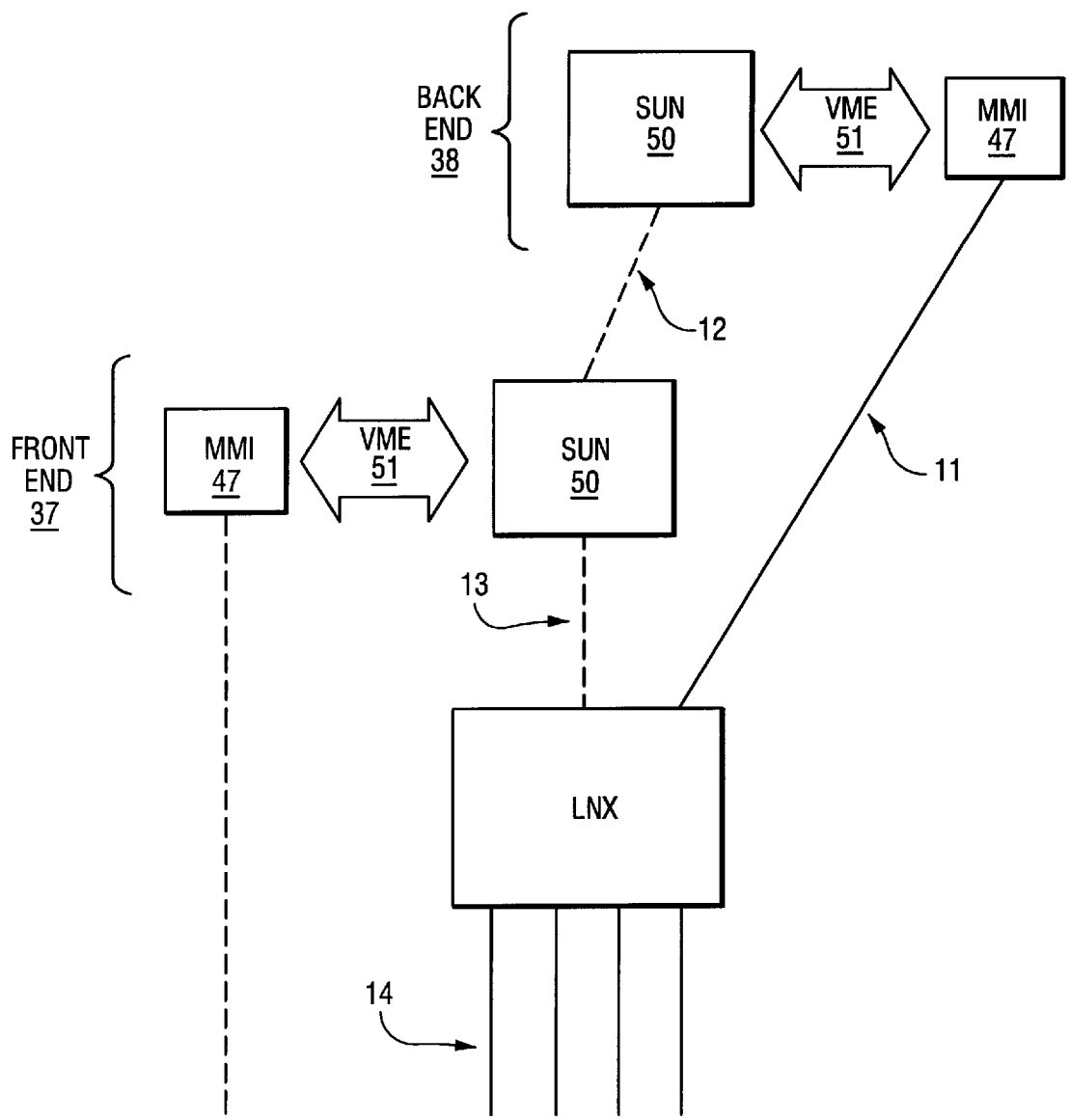
FIG. 8 is a simplified block diagram illustrating the communications links between the front-end and back-end of an example embodiment of the present invention.

FIG. 8 shows a general picture of the signaling and voice trunks for a clustered system. This diagram (unlike the example installation described above) shows only a single back-end machine 38 with a common-channel signaling between the network and the front end 37. A Multi-Media Interface (MMI) board 47 would be used to provide the lower layer functionality. Of course, additional back-end machines can be employed in accordance with the teaching herein, but for simplicity of the discussion, only one back-end is used in this example. As shown in FIG. 8, each MXE (front or back-end) includes MMI 47 and a platform 50, such as a server/workstation manufactured by Sun Microsystems). The function of the virtual line exchange that forms the basis of the signaling between the workstations 50 of the front and back-ends 37 and 38 is now described in more detail paying particular attention to the functions that permit the back-end MXEs 38 to believe that they are communicating through an LNX to network channels 14, without modification to the back-end MXE stand-alone operation.

The Virtual Line Exchange node acts as an exchange for routing calls, and the term virtual refers to the fact that the signaling interface to the back-end is based on the idea of creating an illusion that there are real voice trunks between this front-end entity and it's adjacent back-end nodes. The VLX, like any standard MXE, is a service-driven node, i.e., a node with an application built from a script consisting of primitives that have a well-defined interface to the messaging platform. It is transparent to the application that a back-end signaling protocol is even being used. All functionality is contained within a single software module which is accessed using standard primitives. This VLX software module is, in the current embodiment of the concept, an emulator that will generate the signals that would otherwise be generated by the actual LNX. As such, it must respond to all of the commands that may be sent by a back-end MXE, and it must initiate the unsolicited commands.

The following is a software design plan describing in detail this new extension. The basis for this concept is that a back-end MXE is unmodified. The front-end MXE contains the VLX module and service primitives.

The VLX software module is similar in structure and format to the existing software that defines the LNX module. These two modules differ, however, in scope. Whereas the LNX module has two modes, i.e., LNX and PCX, and as it supports command batching and redundant CPU switchover, the VLX, emulating only a single LNX CPU, contains less functionality, and is therefore considerably less complex and smaller in size.

Mention will be made throughout this document to the VLX context structure, which like it's counterpart found in the LNX module, acts as a central point of control, maintaining most of the data structures which are highlighted below.

4. HEARTBEAT SYNCHRONISATION

The VLX module will periodically generate the "poll" message that the back-end machine will expect to receive. This message, like the message that is generated by the real LNX, will indicate whether or not a download is required. The VLX will set the download indicator bit of this message according to what the version number is set to (the version number is contained within the VLX context structure, and a download in this case refers to a subscriber download which is discussed further under LOOKUP-TABLES). The version number will be set to zero if no subscriber information can be obtained locally, i.e., from the front-end. The poll message will then be set to indicate that a download is required. There is also a value (contained within the VLX context structure) that indicates whether or not the back-end machine has responded to the poll. This integer value is decremented at each heartbeat interval, and is reset to its initial value each time the heartbeat is acknowledged. If this value ever reaches zero, an alarm will be generated and all channels to that back-end machine will be blocked.

The VLX can also receive a "service state" message indicating that one or more channels to the back-end should be blocked (this is discussed further under SERVICE STATE SYNCHRONISATION and CHANNEL SERVICE STATE). But whether it is the result of an outage on the back-end, or the result of manually initiated line blocking, the front-end will send the corresponding "out of service" event to the call-processing application. Again, to emphasize, the application running on the front-end does not know that these channels are "virtual." Traffic is affected just as it would had these channels been "real."

5. CONFIGURATION

The telephony configuration of a given back-end machine is mutually exclusive to that of any other back-end machine. Each VLX controller on the front-end will be configured similarly to that of the corresponding LNX controller on the back-end. This mirror-image configuration is only for the purpose of maintaining system integrity. The configuration messages received from the back-end are NOT sent to the LNX. The VLX will match the parameters of the incoming messages with the parameters that have been obtained from the TCR and TCH databases. The VLX will generate response messages that contain the board, facility and channel information that the back-end machine would have received from the LNX had it been connected directly. Parameters from the facility list of the TCR database and the DSP configuration file (which is referenced by the TCR database) are used to populate the TFE board structure which exists for the VLX just as it does for the LNX and other telephony controllers. Parameters from the TCH database are used to populate the TFE channel structures.

6. LOOKUP-TABLES

The back-end machine initiates a subscriber download (meaning a transfer of subscriber mailbox numbers from the back-end to the front-end machine, where they are stored in the lookup-table). This procedure is initiated by the existing "load" command, but it can also be initiated automatically when the front-end machine is first brought up (just as is done for the LNX).

As there is both an active and a standby table, as described previously, an update to the subscriber list will be made to the standby side, and a switchover will be made from active to standby following the reload. The following commands will be handled by the VLX for loading the standby lookup table:

a. The "version" command will be sent from the back-end machine to determine if a "subscriber" download is required. The VLX will read the version from it's context structure and return this value.

b. When the "begin download" command is received, the number of entries will be reset to 0, the standby lookup-table will be initialized, and the version will be cleared.

c. When the "set record" command is received, the subscriber id will be extracted from the message and encoded into an appropriate format (see lookup-table encoding description below), and then loaded into the lookup table.

As a default for obtaining the subscriber information from the back-end machine, and as a means for being able to use any machine, regardless of software revision, it is possible to read messages containing the records of the listed subscriber database file.

This, however, is more useful in a lab environment. It is also possible (and the preferred method used) to read messages that only contain the subscriber id, and which are additionally compressed into subscriber blocks.

d. When the "download complete" command is received, the version will be set to an appropriate value and a switchover will be made from the active to the standby lookup table.

In order to deal with a quick recovery of the subscriber data, i.e., the lookup-tables, the data will be written to a system file once the reload is complete. When the VLX controller is opened, it will set the version number based on whether or not this file exists. If the file doesn't exist, then the version will be reset, and the only time the file is cleared, is when the controller is explicitly closed. Otherwise the contents of the file are read into the lookup-table.

Figure 12:
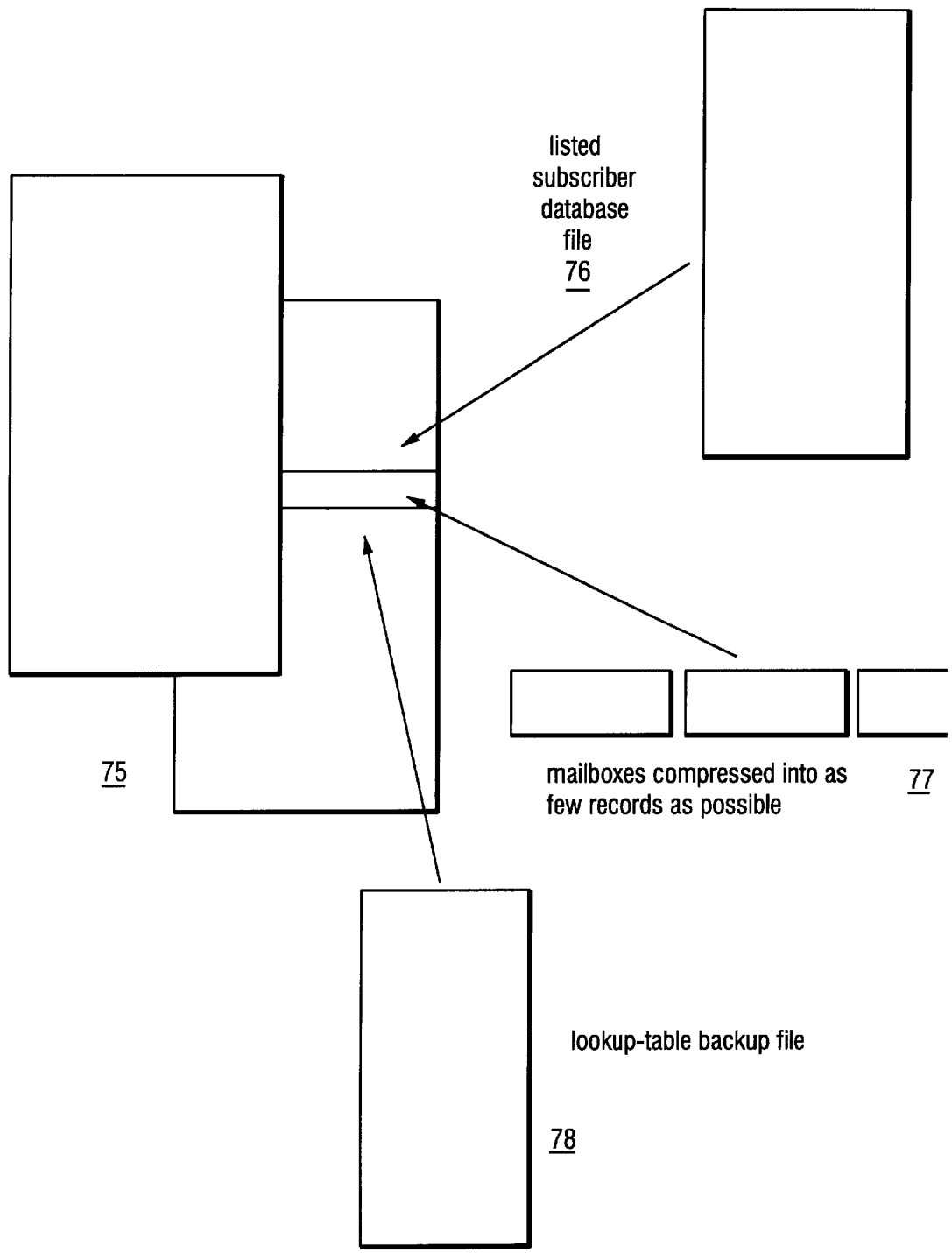
FIG. 12 illustrates the front-end machine lookup-tables and the different sources from which lookup-table data may be loaded in accordance with an example embodiment of the present invention.

FIG. 12 shows the three different sources that the lookup-table data 75 can be loaded from the listed subscriber database file 76, the compressed mailbox records 77, and the lookup-table backup file 78.

Assuming the subscriber database is in ascending alphabetical order, it becomes necessary to compensate for having different mailbox lengths. For example, the mailbox 2 could be added to the lookup-table following the mailbox 12 (2 is alphabetically greater than 12). So, assuming a maximum mailbox length of 18, 16 trailing zeros could be added to the 12 mailbox and 17 trailing zeros added to the 2 mailbox. When an incoming call arrives, the necessary number of trailing zero's would then be added to the B-number, and the mailbox could be accessed from the lookup-table. To distinguish the number 2 from the number 20, for example, an indicator specifying the number of "non-mailbox" zero's will be stored within the lookup-table entry.

FIG. 13 is an example, showing what a sorted list of mailboxes might look like.

Assuming an 18 digit maximum mailbox length, 32-bit integers for both the low-order and high-order 9 digits are used (see FIG. 13), and a third integer is used for the total number of "mailbox" digits.

Note that two different lookup-tables have been defined for the system: the local VLX lookup-table used for synchronization with the subscriber database and the master TFE lookup-table used for global system access. Whereas the VLX table is identical in structure to the definition described above, the TFE table differs in that the third integer is divided into two 16-bit words. The second word is used to store the subscriber's hunt group.

When an entry is added to the lookup-table, it must be encoded and stored in the above structure. First, the length of the string will be calculated and stored. Then the number of trailing zero's will be determined, and the high and low-order 9 digits will be converted to integers.

To find an entry given the B-number, the B-number can be converted into it's encoded form, and then a binary search can be performed. The comparison steps as part of the search algorithm will be as follows:

a. Look at the "high-order" integer. This will tell us if the table entry is greater than, less than, or equal to the B-number.

An assumption is made that the two values are equal since we will only continue to examine the entry if this is the case.

b. Look at the "low-order" integer. Again, this will tell us if the table entry is greater than, less than, or equal to the B-number.

Assuming that the two values are equal since we will only continue to examine the entry if this is the case.

c. Look at the number of "mailbox" digits. This will tell us if the table entry is greater than, less than, or equal to the B-number.

The potential snag here is the fact that there can be leading zero's in a mailbox number. But since the entry is "left-justified" and there is a digit length indicator, the two values can be distinguished in the number of leading zero's. The value 02, for example, will appear as 020000000000000000, while the value 20 will appear as 200000000000000000. The length indicators will be the same, but the high-order integer of mailbox 20 will be greater than that of 02.

When the VLX is initialized, the primary table will be set to be active. If the backup file for this controller exists, then it's contents will be loaded into the standby lookup-table, the version will be set to an appropriate value, and a switchover to the standby table will then be made. If the file does not exist, the version number will be reset, and a subscriber download will be initiated by the remote side, i.e., the back-end machine.

The contents of the backup file can be the encoded ascii subscriber mailbox data which can be loaded directly into the standby lookup-table.

As an alternative to using the backup file, the input can be redirected to the file specified within the VLX context structure. This file will in fact be the same file that the back-end machine will use when transferring the subscriber data remotely.

Whereas the backup file will typically be used at system initialization time, a file referenced by the VLX controller can be used to over-ride this file. And the same applies when a local download is invoked. Therefore, to make this possible, if the file name does not exist within the context structure, then the backup file will be used.

The TCR run-file formats (located in the TCR database record) will be identical to the different file formats that the host (i.e., back-end machine) can send to the VLX. The same parsing algorithms, therefore, will be used. The different file formats will be:

a. A file with the current listed subscriber database format; and b. A file containing a compressed representation of an update to the subscriber list.

This second file format (described above) is called "subscriber delta coding," and it will allow for modifications to a lookup-table, i.e., add/delete subscribers, without the host having to send the entire list.

The subscriber delta coding will consist of a lookup-table encoded subscriber mailbox, a lookup-table index, and a block count. From this "run-length coding," a block of subscriber mailboxes can then be added or deleted from the lookup-table on the front-end machine.

The file containing this encoded data will typically be created by an off-line utility which will:

a. create a representation of the active lookup-table from a backup file b. create a representation of the standby lookup-table from the subscriber database c. write the representation of the standby lookup-table to the backup file d. create a delta file as described below The delta file will contain the information needed for the front-end machine to reconstruct the standby lookup-table that has been created on the back-end machine. The contents of this file will be in a compressed form so as to allow as little information as possible to be sent over the signaling link.

The algorithm for creating the encoded data is as follows:
a. reset index pointers for both active and standby tables
b. if the active table entry equals the standby table entry, then increment both indices and repeat step b.
c. if the entries are not equal,
 i. if the entry for the standby table is greater than that of the active table, create a "negative" encoding for the value in active table and go to step d.
 ii. if the entry for the standby table is less than that of the active table, create a "positive" encoding and go to step e.
d. increment the active table index and
 i. if the standby entry is greater than the active table entry, and the active table entry is one greater than the previous entry, then update the block count of the "negative" encoding and repeat step d.
 ii. if the standby entry is greater than the active table entry, but the active table entry is not one greater than the previous entry, then create a new "negative" encoding for the value in active table and repeat step d.
e. increment the standby table index and
 i. if the standby entry is less than the active table entry or the end of the active table is reached, and the standby table entry is one greater than the previous entry, then update the block count of the "positive" encoding and repeat step e.
 ii. if the standby entry is less than the active table entry or the end of the active table is reached, but the standby table entry is not one greater than the previous entry, then create a new "positive" encoding for the value in the standby table and repeat step e.
f. if the active table index is still within range, i.e., pointing to valid entries, then go to step d.
g. if the standby table index is still within range, i.e., pointing to valid entries, then go to step e.

In order to ensure that the content of the delta file is correct in terms of having been generated from an accurate representation of both the active and standby tables, "checksum" entries will be included in this file as well. Specifically, the first entry in the file will be a checksum entry for the active table, and the last entry will be a checksum entry for the standby table. A checksum entry will have the same fields as those of the block encoded entries. The checksum entry will be defined as three integers of the lookup-table entry part equaling a sum of each of the corresponding integer values of each entry in the lookup-table. For example, if the lookup-table contains the two entries 101 and 201, then the checksum will be 302. These values will of course be modulo the size of an integer. For the remainder of the entry, the slot will be 0, and the block count will be the total number of entries in the lookup-table. The checksum entry for the active table will also consist of the ascii character "a," whereas the standby table entry will have an ascii "s." When the front-end machine begins decoding these delta file entries, it will first determine if the entries are relative to the active table, or if they represent a brand new table. This is determined by the active table checksum entry, i.e., an entry containing all zeros will indicate that a new table should be created. Finally, after the standby table has been re-created on the front-end machine, the corresponding checksum entry will be used to verify that the table is correct.

It will be the host's responsibility to ensure that the content of the data files used for delta coding in the VLX context structure is correct (or more accurately the content of the record since this is what the VLX will see). If for any reason the VLX cannot accurately create the lookup-table, an appropriate response such as "invalid record" will be returned to the host.

In order to update the subscriber list, i.e., the active lookup-table, it is possible to create a new backup file (or run-file) or modify the existing file, and then reload the file into the standby table and do a switchover. In order to accomplish this, the "load" and "start" commands are implemented for the VLX controller. These same commands are used to initiate the remote subscriber download, but for the LNX controller. Implementing these commands for the VLX permits a "local" subscriber download.

7. CALL-PROCESSING

A front-end machine will be configured with N LNX telephony channels directed towards the network, and (L*M) VLX telephony channels directed toward the back-end machines, where L equals the number of back-end machines and M is the number of telephony channels on each back-end machine (M can of course be different for each machine, but it will more commonly be the same). There will also be a set of LNX channels for the "back-end" MMI's which will typically be equal to the number of VLX channels.

A hunt group obtained from the lookup-table on the front-end machine is used by the switching service to forward calls to the back-end machine. When a call is received on, for example, channel 3, 8, the service will:
 a. search the lookup-table using the address information from the incoming call, and
 b. if a match is found, the subscriber's hunt group (associated with the correct VLX module) will be returned.

The "outcall" primitive which will then be invoked, will
 a. select a channel at random from a pool of channels that have been configured with this hunt group, and
 b. initiate a seizure.

An outgoing call from the back-end to the network will be similar.

Once the outgoing call has been setup, the switching service will listen for events which can come from either the back-end, or from the network. The following examples give an idea of the type of additions needed to the front-end software. From the "back-end" side, the following type of events can be expected:
 "answer"
 "connect"
 "start listening for DTMF signals"
 "stop listening for DTMF signals"
 "release"

From the "network" side, the following type of events can be expected:
 "DTMF signals"
 "release"

The following new telephony service primitives have been added:
 a. Search for an entry match and return the hunt group configured for the selected VLX controller.
 b. Listen for events received from both parties. A DTMF signal received from the network side will be returned to the service, whereas "telephony" command events from the back-end side will be sent to the LNX.

c. Invoke "outpulse digit(s)" TFE primitive, which will in effect generate an LNX message indicating that a DTMF signal has been detected.

The following new TFE/VLX vectors (functions known by the TFE layer which are common to all the different software modules—once the modules are plugged in, the vectors get defined for the specific modules) have been added:

a. Send "request for service" message.
b. Search for table entry,
c. Send "request for service" message.
d. Send "release" message.
e. VLX Module Initialization
  i. allocate memory for active and standby lookup-tables,
  ii. check the lookup-table backup file, initialize the lookup-tables, and set primary to be active,
  iii. allocate memory for data structure containing DSP configuration,
  iv. initialize DSP data structure, and
  v. initialize board configuration data structure within the TFE controller context structure.
f. Create a (virtual) board configuration based on the contents of the TFE controller record (all software modules maintain a TFE configuration).

Note that each VLX controller corresponding to a back-end machine will have a mirror-image TFE configuration.

8. SERVICE STATE SYNCHRONIZATION

In order to maintain the proper state between the back-end and front-end machines, a state table exists for handling the transitions between each of the following states:

"remote side in service"
"remote side out of service"
"local side in service"
"local side out of service"
"both sides in service"
"both sides out of service"

and the state will be maintained for each channel.

A "set service state" command response is handled by the VLX and a corresponding "DSO status change" command is generated by the VLX. These command/responses are used to drive the state transitions.

The following section describes in more detail how the state of the channel is maintained:

9. CHANNEL SERVICE STATE

In order to synchronize the state of the channels on the back-end machine with that of the channels on the front-end machine, an array indexed by the channel (facility/offset) will contain it's state, a value specifying whether the channel is in service (set in service by the front-end machine), a value specifying that service is pending (a request has been issued by the back-end machine to put the channel in service), or a value specifying that the channel is out of service (neither the front-end machine nor the back-end machine has attempted to put the channel into service yet). By maintaining these states, a response to the back-end machines request to bring the channel(s) into service can be:

sending back a "DSO status change" message if the channel is in service (brought into service by the front-end machine), or "marking" the channel(s) as having its service state pending.

If the channel is marked as having its service state pending, then when the request by the front-end machine is received, the "DSO status change" message(s) can be sent out, and the channel state will be updated.

To account for the channel(s) being taken out of service, as well as channel(s) being brought into service, a response can be provided in a similar way to the back-end machine's request to bring the channel(s) out of service by:

sending back a "DSO status change" message if the channel is out of service (brought out of service by the front-end machine), or "marking" the channel(s) as having its service state pending.

10. HOOK-FLASH OPTION

In the event that a call is received with no subscriber identification, i.e., no A-number, then a back-end machine can be selected to prompt for the subscriber id, and after the digits have been collected and it has been determined that the subscriber does not reside on the current machine, the call can be transferred to the correct back-end machine by the use of the "hook-flash" option.

The term "hook-flash" is used since, as it appears to the back-end machine, the call is being transferred using a real hook-flash signal. That is, the back-end machine thinks that it has "instructed" the LNX to generate the hook-flash. However, since the "LNX" message has really been sent to the virtual LNX on the front-end machine, the switching service on the front-end simply determines the correct back-end machine and then re-connects the network channel to the newly selected back-end MXE.

The message sequence would be as follows:

a. Caller is routed to any back-end machine,
b. After determining that no subscriber identification exists,
  i. "hook-flash" message is sent to front-end,
  ii. back-end waits for "dialtone message,"
  iii. once the front-end has received the hook-flash message, it sends the dialtone event back to the back-end,
  iv. back-end outpulses digit string,
  v. front-end receives digit string and outdials to the correct back-end machine, and
  vi. the channel to the initial back-end machine is released, and the network channel is reconnected to the newly selected machine.

The following telephony service primitives would exist:

Generate hook flash—this would consist of a telephony service primitive. This telephony service primitive calls a corresponding TFE/LNX vector which will call an appropriate LNX primitive to generate the "hook flash" message.

Wait for dialtone—report the dialtone message received from the VLX by the LNX to a waiting service primitive.

Generate dialtone—in response to the "hook flash" event, the front-end service will invoke a primitive which will generate a "dialtone" message. Just as the backend LNX controller generates the hook flash, the front end VLX controller generates the dialtone; a TFE/VLX vector will call a VLX primitive.

Wait for digits—the VLX of the front-end machine will then wait for the digits that it expects from the backend machine that are sent in the form of an LNX message. The message will therefore be added to the VLX handling capability and reported to the service.

11. CONNECTING THE VOICE CHANNEL

When the service on a back-end machine attempts to generate a voice prompt, a connection to the network must be established. For this, a command is sent to the LNX instructing it to make the connection. This command is sent to the front-end machine, which in turn is sent to the LNX. Because it is important to be sure that the back-end machine does not, for example, generate a voice prompt before the connection has been made, the "connect" primitive is handled in a special way.

When the connect command is received by the VLX, the usual response to the message is not sent back. Instead, after the command has been forwarded to the LNX and a response to this command has been received, the VLX will then send the response to the back-end machine by calling an appropriate TFE primitive which, when mapped to the VLX, will simply send the message and return.

So a typical call flow for the "switch" service will be to:

a. complete the call-setup on the network side
b. establish an outgoing call to the back-end machine
c. wait for the back-end to "connect" a voice channel
d. connect the channels and send the response to the back-end machine.

The VLX primitive will be mapped to the TFE primitive with a TFE/VLX vector. Since there must be some way of correlating the initial command with the "delayed." response, the sequence number will be stored in an array that will be indexed by the facility/channel pair. This array will be added to the VLX context structure, and accessed by the facility/channel pair which will be the VLX primitive parameters.

12. DATA STRUCTURES

The VLX includes the following data structures, which are part of the VLX context structure:

1. Two element array of pointers to active and standby lookup-table data structures.
2. Active lookup-table indicator.
3. Number of entries in lookup-table.
4. Pointer to state-table data structure for maintaining the service state of each channel.
5. Array of channel states dimensioned by maximum number of facility/channel pairs.
6. Pointer to data structure containing the emulated DSP board configuration.

Figure 9:
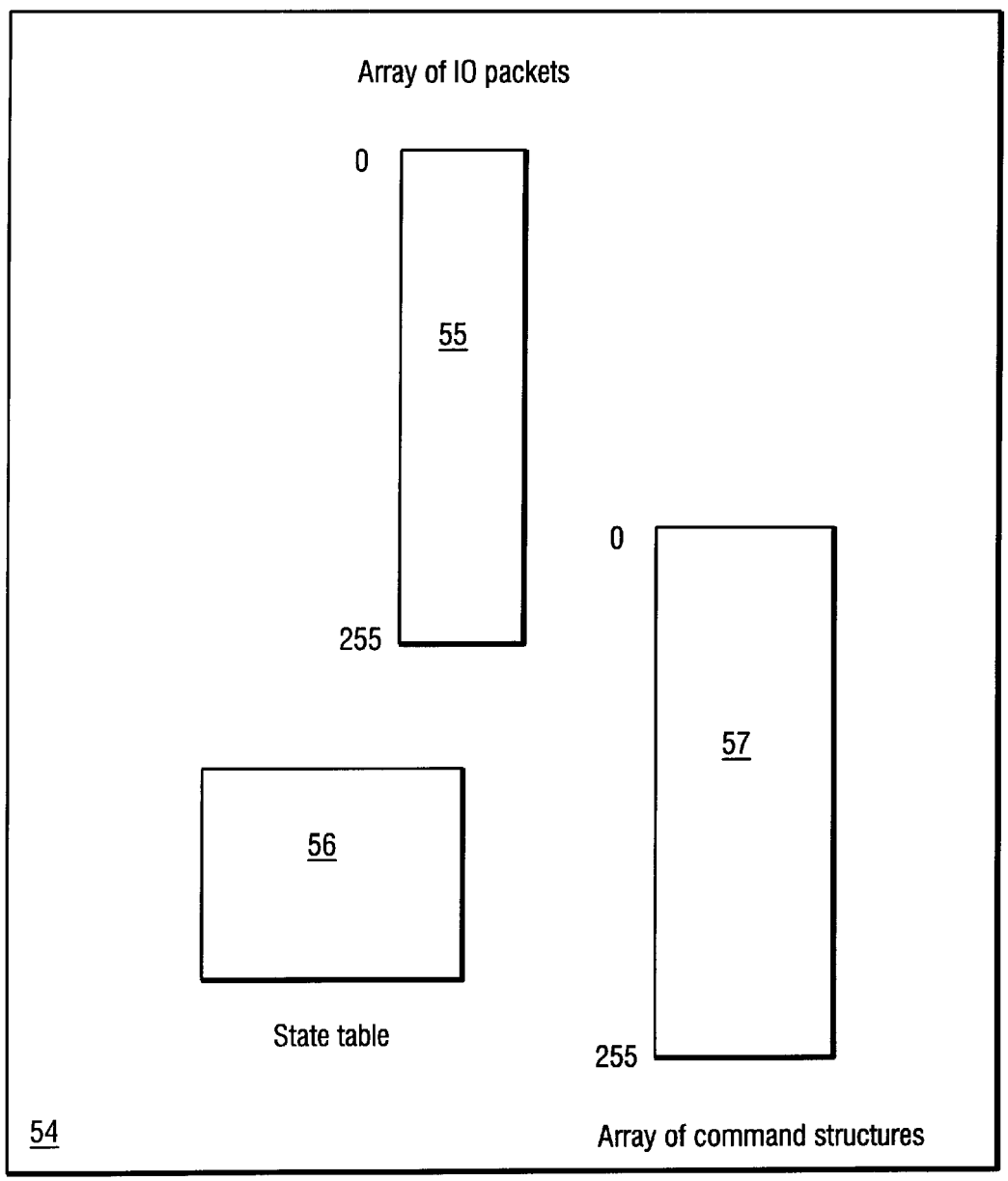
FIG. 9 is an example LNX software module containing data structures in accordance with an example embodiment of the present invention.

Contained with the LNX software module 54 are three important data structures represented in FIG. 9:

a. A 256 element array of pointers to IO packets 55 which contain pointers to packets containing command requests and corresponding responses. These IO packets are indexed by the sequence number corresponding to the command.
b. A 256 element array of structures 57 containing command information. These are indexed by command code. These structures contain the event that the command should post to the LNX state machine.
c. State table 56 used to drive LNX state machine. This is a two-dimensional array indexed by state and event. These two values determine the action routine to be invoked for a specific command.

Figure 10:
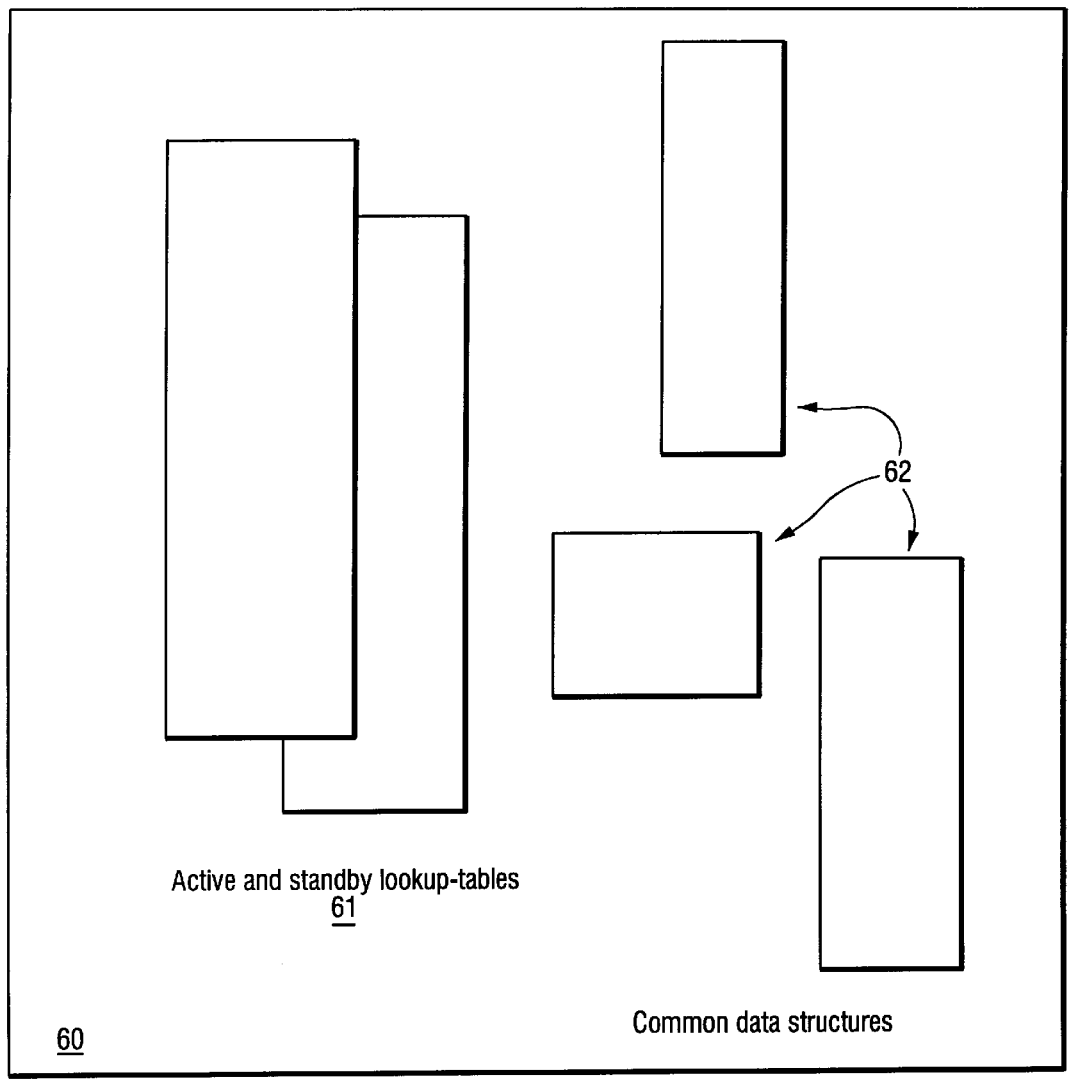
FIG. 10 is an example set of data structures for the VLX software module in accordance with an example embodiment of the present invention.

The VLX software module 60 (FIG. 10) contains the same data structures and mechanism for controlling a command dialogue. As described previously, in addition to these three data structures, active and standby lookup-tables 61 have a list of compressed subscriber id's in addition to common data structures 62.

During normal system operation, when a VLX primitive is invoked, for example as shown in FIG. 6, a command is registered in data structure 55 of FIG. 9 based on an allocated sequence number, and an event is generated, resulting in the action routine in data structure 56 being called. The data will then be delivered to the lower layer.

When an unsolicited command is received by the LNX module, the command will be translated into an event using data structure 57 of FIG. 9, and the resulting event will invoke the action routine in data structure 56. The data will then be sent to the upper layer.

If a command response is received, it will be translated into an event using data structure 57, and the resulting event will invoke an action routine in data structure 56. Data structure 55 will then be accessed in order to match this response with it's corresponding command. This scenario will be true for the reverse direction as well.

For a Wait Signal primitive and a Wait Connect primitive, the telephony commands that have been initiated by the back-end are forwarded to the network party without resulting in a change of state. These primitives will simply listen for incoming events, but when a telephony command is issued from the back-end (this action is implied by the event), the command is simply forwarded to the network, i.e., to the LNX. There is therefore no change in state for the switching service.

Events that would cause a change in state would be, for example, a release from the network or a release from the back-end, subscriber signals that would come from the network, or a hook-flash from the back-end.

Once a call has been setup, the switching service will monitor the call and listen for events from either the calling or called parties.

A subscriber signal would typically result in a change in state that would invoke the primitive for sending the same signal to the back-end. Here the appropriate party would be specified for selecting the back-end's virtual channel.

Figure 11:
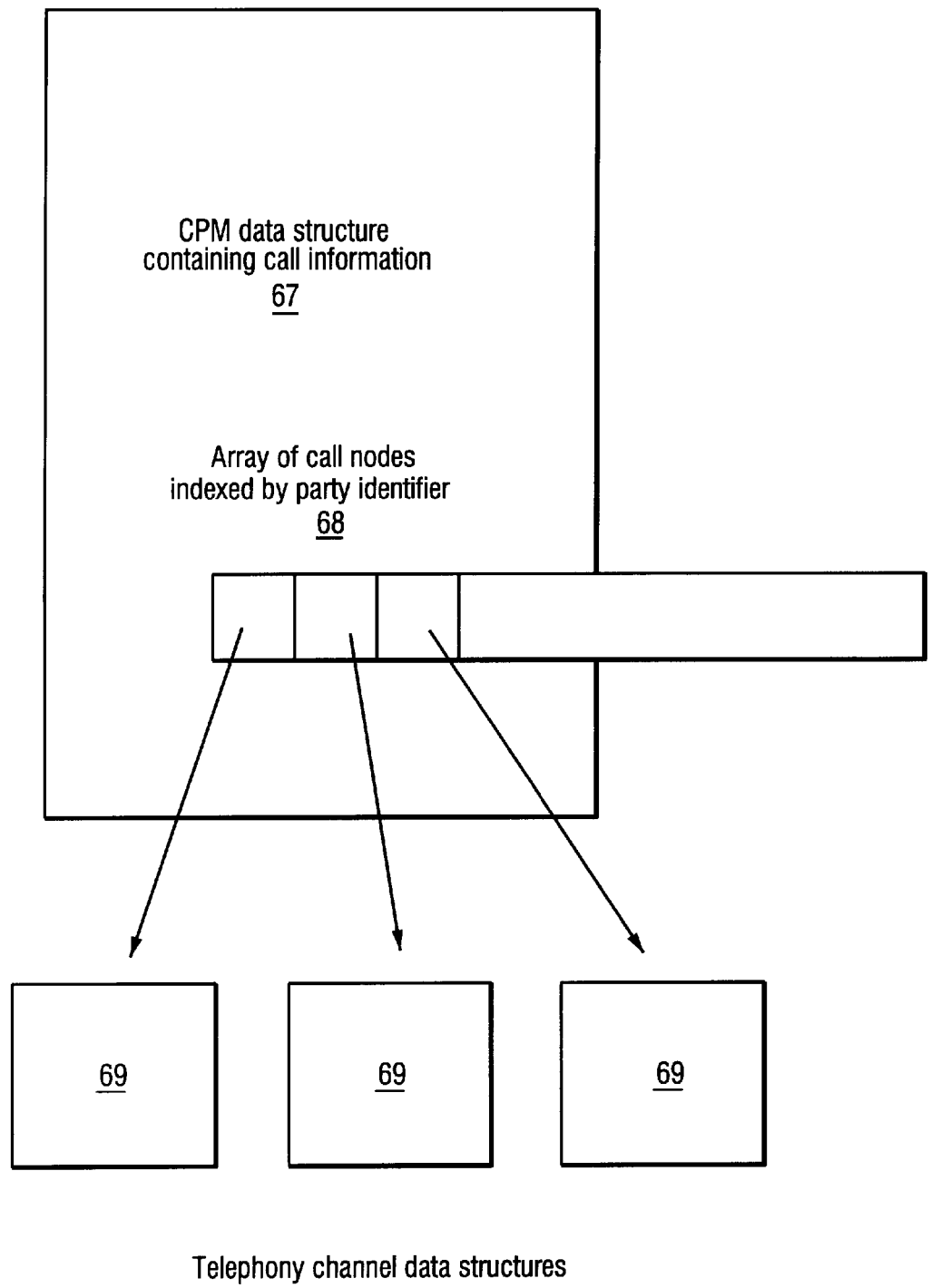
FIG. 11 illustrates the data structures maintained for each call which include an array of call nodes containing channel-specific call information.

For each data structure 67, (of which there is an instance for each call), there exists an array of call nodes 68 which correspond to the parties of a single call, i.e., calling and called parties. This is represented in FIG. 11. There can be any number of parties for a single call, but the first node will typically be the calling party and the second node would be the called party. Within these call nodes there is a reference to the telephony channel 69 that the calling party has called in on or to the telephony channel of the called party which the service has selected for dialing out on.

Once a call node has been attached to a particular party, the switching service must reference the call node based on it's party identifier in order to control the sending of signals. When receiving events, it is not necessary to identify the call node since the event itself implies the party of the call.

Most of the above-described example embodiments detail how one might construct a single cluster of MXE nodes for the purpose of creating a High Capacity MXE. The example usually consists of four MXE nodes and a single LNX. In still another alternative embodiment, that system is brought to a second level of clustering to extend the capacity of such a system well beyond the single cluster embodiment.

FIG. 3 shows one such multi-cluster embodiment employing a circuit switch access (CSA) added to the embodiment of FIG. 1 in order to further extend the capacity of the cluster. In the embodiment of FIG. 3, the extended cluster 23 includes the cluster 10 of FIG. 1 with the addition of signaling links between each back-end and the CSA carrying information about the virtual network channels, just as was provided between the back-ends and the front-ends of virtual channel signal links 12. These links between the back-end and CSA 24 are used by the CSA to communicate the virtual channel-to-real channel translations to a secondary cluster via the signaling links 26. The purpose of this CSA node then is to allow traffic from multiple front-ends to be concentrated into a single (redundant) node that would be responsible for routing to the back-end.

This extended cluster 23 is described in greater detail below, following a background description of FIG. 4.

Figure 4:
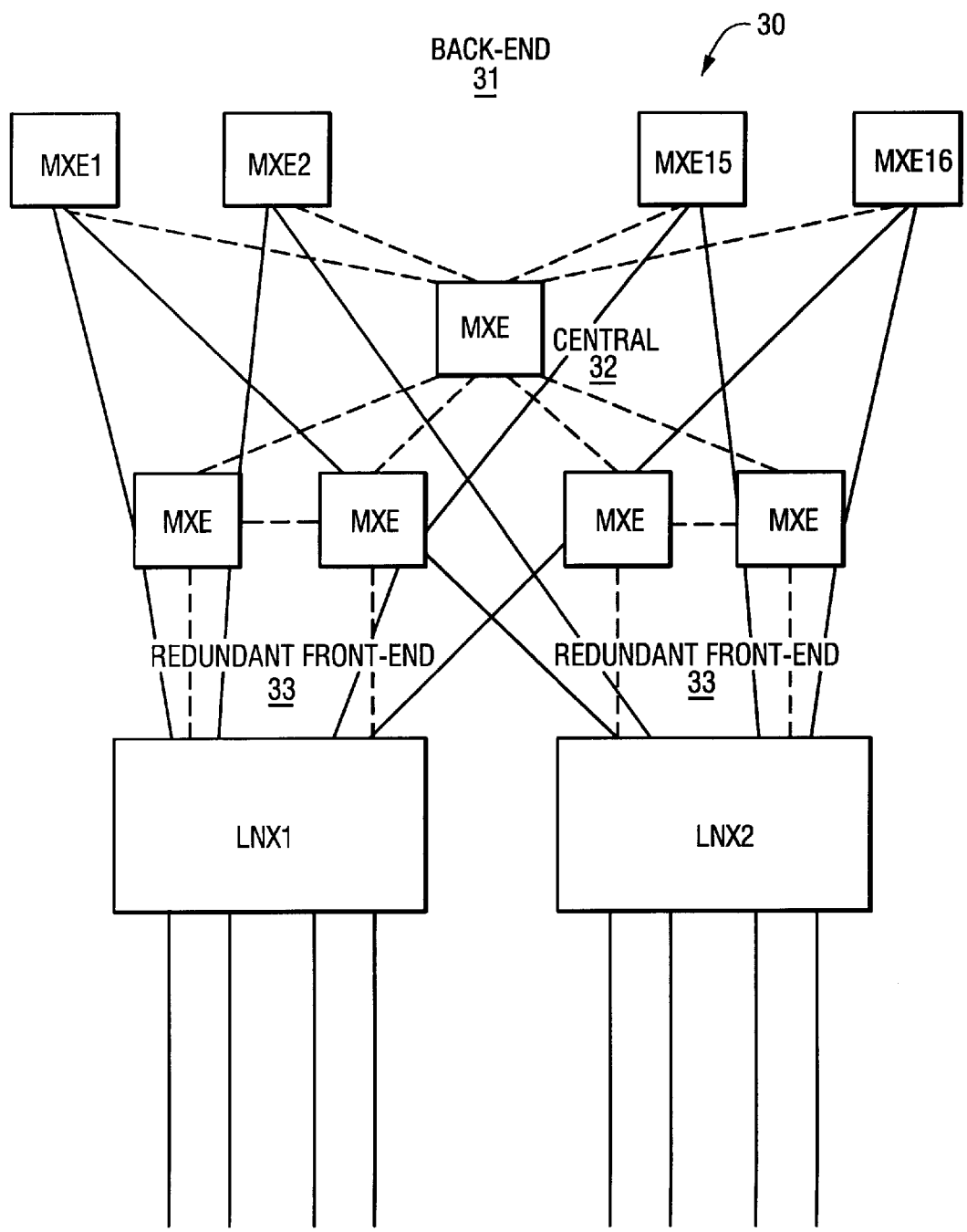
FIG. 4 is an example embodiment of an extended configuration of an example embodiment of the present invention.

FIG. 4 shows a multiple cluster system 30 in which the back-end 31 includes MXE 1, MXE 2, . . . MXE15, MXE16, communicating with a central MXE 32. Central MXE 32 then communicates with redundant front-ends 33, which communicate with LNX controllers (LNX1 and LNX2), which communicate to the real network channels 14 as described previously with respect to FIG. 1.

For this extended configuration, it should be possible to have the single central node sitting inbetween two (or possibly more) front-ends and an array of back-ends. Using present technology, sixteen back-end machines could yield a combined subscriber capacity of, for example, 800,000, where the central node would be necessary to reduce the number of signaling links to the back-end, and for managing the subscriber lookup-tables.

The ability to expand a single cluster is limited by 1) the ability to configure additional channels (both real and virtual), and 2) the load capacity of the front end machine. Beyond those limitations, the present invention contemplates multiple clustering.

The following describes what is believed to be the most practical and efficient means for expanding into a double-cluster or other multiple-cluster arrangement. A second level of clustering begins by first setting up a duplicate of the single cluster that has already been described.

Once in place, the two independent clusters can be "meshed" such that each front-end machine, instead of being connected to three back-end machines, will now be connected to all six back-end machines. Each back-end machine will, however, only have 60 channels (for example) going to each front-end machine (rather than 120 available (for example) in stand-alone or single cluster mode). That is, the number of channels for each signaling link is reduced from 120 to 60, but the same traffic load is maintained as there are now two circuit switching controllers, one to each front end machine. Thus, each back-end machine will still have 120 channels, because a second LNX controller is added, thus permitting 60 channels coming from each front-end to each of these back-end controllers.

One might expect this to limit the system to only 60 channels. However, to begin with, this is unlikely because the network will distribute the traffic evenly when it selects a route to the MXE, and the channels will, therefore, be distributed evenly between the two front-end machines. There is, however, the possibility still that all channels from one front-end to a given back-end are occupied, while nearly all channels from the other front-end are available.

To handle this, the network channels for each front-end machine are divided into two LNX channel groups. Now the second group of channels for each cluster will be for the LNX on the other cluster as there are now two LNXs, each having two CPU boards. These CPU boards include the ability to be able to switchover to a standby LNX matrix. That is, the software that controls the LNX is designed, such that if a second LNX matrix board is configured, and if either the active board becomes faulty or the control link is disconnected, the MXE will detect this failure and begin to use the standby system. So two links are available, where the second link is going to the standby matrix on the other LNX.

Figure 14:
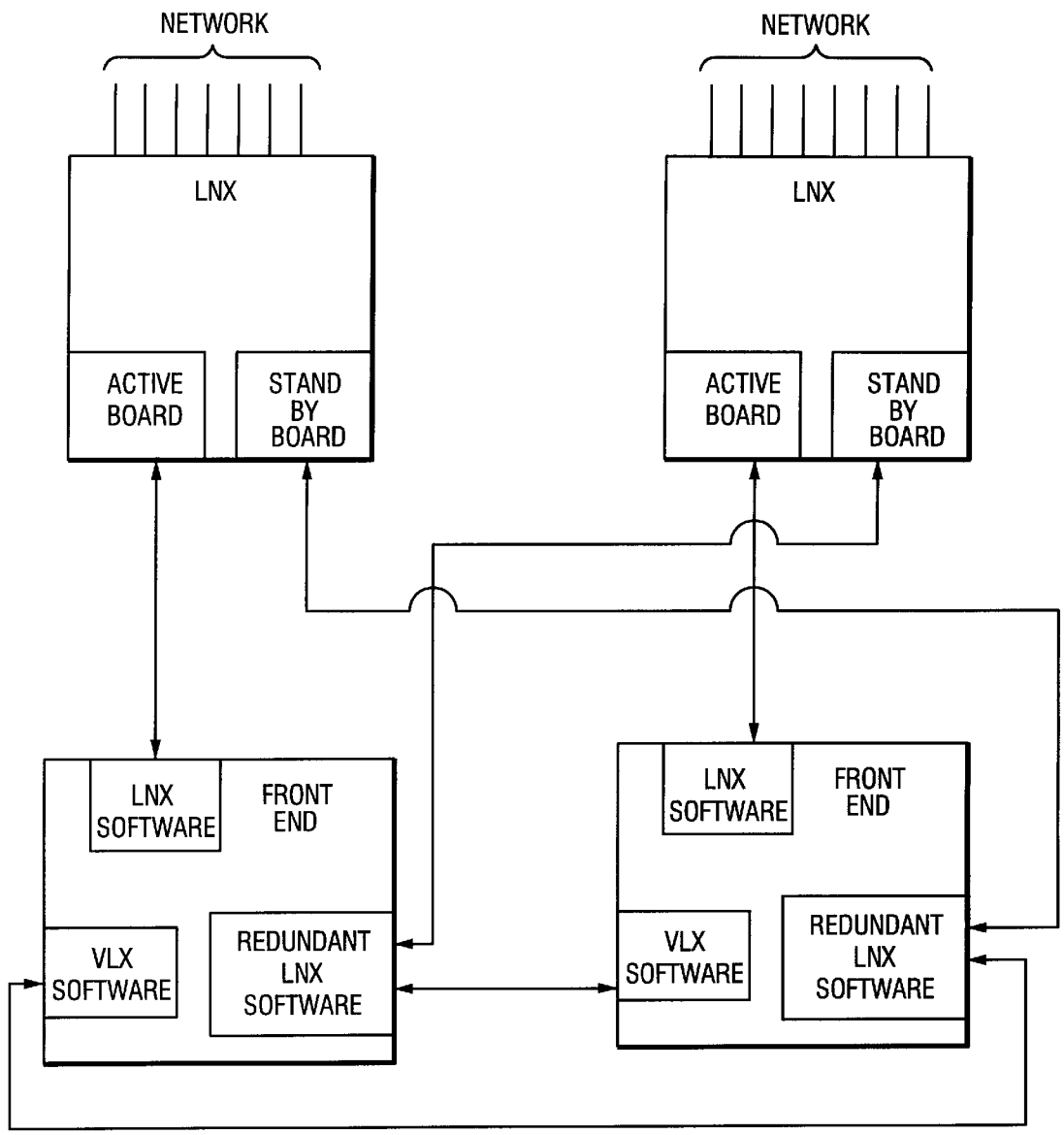
FIG. 14 is a schematic diagram of a front-end and LNX combination for an example multiple clustering embodiment of the present invention.

FIG. 14 illustrates an example of this embodiment. The two LNX's are shown (one for each front end). Each LNX has an active board and a standby board. The active board is linked to the corresponding front end. That is, the first front end associated with the first LNX are linked together. The front end receives the active board link from the corresponding LNX at the LNX software module of the front end. A redundant module is also included in each front end to receive a redundant pair. This pair includes a link from the standby board of the opposite LNX and a link from the VLX module of the opposite front end. Thus, each front end receives three cables: 1) from the single active LNX board on the corresponding LNX, 2) from the redundant standby LNX board on the opposite LNX, and 3) from the VLX module of the opposite front end.

Ordinarily, the standby board of each LNX carries no traffic. Thus, each front end receives traffic from the active link of its corresponding LNX and from the VLX module of its opposite front end. But, if one of the front ends crashes, the virtual link will die with it and the standby board will then take over. In the end, the LNX ahead of the crashed front end can still control traffic simultaneously with the other LNX to the one operating front end. One LNX will feed the operational front end via its active link to the LNX software module at the front end and the other LNX will feed the front end via its standby link to the redundant LNX software module at the front end.

When the system is configured for redundancy, each of the two controllers has two links. Once redundancy configurations are imposed, the first controller has one link remaining, while the second controller has two links. This second link of the second controller is connected to a port on the other front-end machine that has a VLX module generating LNX signals. Then, to be able to switch calls to the second front-end machine, in order to avoid the condition described above where all channels on one side are occupied, a set of VLX channels is simply configured to do so.

Next, the selected MMI must be guaranteed to be physically connected to the LNX that the call came in on. By configuring the MMI channels such that they have an appropriate hunt group, that is, a hunt group that corresponds to the LNX that the MMI channel is physically connected to, and by hasing the front-end service, for example, add a prefix to the address information that gets sent to the back-end, then the service running on the back-end can select an MMI such that it will always be connected to the correct LNX. In effect this is a communication scheme to allow the front-end to tell the back-end which LNX the call has come in on.

The description above with respect to FIG. 4 includes an example of how a "three-tier" configuration could be created that would allow for such a large-scale cluster. There is, however, a short-coming with that model, namely, that the "central" node would not have the thread capacity to handle the required number of calls (the current MXE software uses a thread for each channel, as well as a thread for each call). And it is also questionable as to whether a single node would be able to handle the required call rate, i.e., whether a single call could afford to go through two intermediary service nodes. One solution, therefore, would be to create a central node that, instead of running a service, would simply do a circuit translation and route the call-processing message. If we describe the service-driven front-end machine as a circuit-switching node, then we could describe the central machine as being a form of packet-switching node.

This solution also opens up the possibility for having a remote connection from a front-end machine to the central node, called the circuit switch access node (CSA) of FIG. 3. This would typically be a leased line, i.e., X.25, going from one site where a telephony network exchange and a front-end MXE would co-reside, going to another site where the central node and the array of back-end MXE's would co-reside.

Once again, as was the case with the VLX controller, a single configurable software module is added to the existing MXE software to create the necessary functionality. As the CSA controller will, for the most part, contain (in mathematical terms), "a union of subsets" of both the LNX and VLX controllers, it will be especially easy to implement in stand-alone systems. There will, of course, be at least one new function needed for allocating channels.

This functionality includes the following features. Based on a "request for service," the central nodes selects the correct back-end machine. Once the back-end machine has been selected, i.e., a controller has been selected, it selects an available channel, i.e., a facility/timeslot. The central nodes then registers this "outgoing" triplet (i.e., the controller, the facility, and the timeslot) with the incoming controller, and registers the "incoming" triplet with the outgoing controller. Subsequent messages with these circuit id's can then be quickly routed to their respective I/O ports. (It is assumed that the necessary input/output buffering is implemented to avoid data deadlocks.) Then, the "cross-connection" between the incoming and outgoing controllers will be cleared, based on the final "release" message.

The following is a typical call scenario, using both the VLX and CSA software modules.

A call comes into a front-end machine on channel 7, 3. The service on that machine switches the call to the central node using a "virtual" channel, say 14,9. The signaling messages are sent over the leased X.25 line (this assumes that the VLX controller has the ability to send messages over X.25). At the central node, the VLX message will be handled by a CSA controller. The CSA controller, seeing that this is a "request for service," will first select the correct back-end machine by selecting the CSA controller for that machine (this will be based on the address information contained within the message), and then select an available channel for that CSA controller, say 3, 5. The circuit information contained within the message will then be modified, and the message will then be sent to the out going controller. A two-dimensional array for each CSA controller will be used to maintain the "virtual" cross-connection, and the entry for each channel element will contain the triplet referencing the corresponding CSA timeslot. For subsequent messages, both messages originating from the front-end, as well as messages originating from the back-end, the CSA controller that handles the message will get the channel translation from it's matrix, (i.e., the two-dimensional array), modify the circuit information, and then send the message to the corresponding controller. This exchange will continue until the connection is cleared, as will be indicated by a "release" message.

So to summarize the changes in terms of both the service and the configuration, the multiple cluster example embodiment:

a. the number of back-end signaling links are doubled, while splitting the number of channels per link in half,
b. a second LNX controller is added on each machine, where the second front-end controller has a second link going to a standby matrix,
c. the front-end service is modified to set a prefix, and
d. the back-end service is modified to read the prefix and select an MMI hunt group.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A multimedia messaging cluster in communication with a telecommunications network, comprising:
   a network exchange for communicating multimedia messages from the multimedia cluster to the telecommunications network via real network channels;
   a front-end multimedia messaging exchange for communicating channel cross-connect signals to the network exchange;
   at least one back-end multimedia messaging exchange communicating with the network exchange to provide the multimedia messages to the network exchange on virtual channels identified to the back-end multimedia messaging exchange by the front-end multimedia messaging exchange, wherein:
   the channel cross-connect signals provided to the network exchange include cross-connect information for the network exchange to cross the multimedia messages from the virtual channels to the real network channels.

2. A cluster according to claim 1, wherein the front-end multimedia messaging exchange includes virtual line exchange modules in a one-to-one correspondence with the back-end multimedia message exchanges, said virtual line exchange modules for communicating virtual channel switching signals to the corresponding back-end multimedia messaging exchanges.

3. A cluster according to claim 2, wherein the virtual line exchange module communicates with a corresponding network circuit switching module located in the corresponding back-end multimedia exchanges.

4. A cluster according to claim 3, wherein the network circuit switching module operates under the same software image whether in the cluster or in a stand-alone mode of the back-end multimedia messaging exchange.

5. A cluster according to claim 4, wherein the virtual channel switching signals also carry subscriber list information from the back-end multimedia messaging exchanges to the corresponding virtual line exchange modules.

6. A cluster according to claim 3 wherein each pair of virtual line exchange module and corresponding network circuit switching module are assigned a predetermined group of said virtual channels.

7. A cluster according to claim 6, wherein any virtual line exchange can assign virtual channels to a corresponding network circuit switching module only from its assigned group of virtual channels.

8. A cluster according to claim 5, wherein the front-end multimedia messaging exchange specifies the channel cross-over signals for the respective subscribers identified by the subscriber list information.

9. A cluster according to claim 3, wherein each network circuit switching module is a standard multimedia channel interface software module employed in a stand-alone operation of the corresponding back-end multimedia messaging exchange.

10. A cluster according to claim 1, wherein the back-end exchange provides the multimedia messages to the network exchange via standard multimedia interfaces.

11. A cluster according to claim 5, wherein the front-end multimedia messaging exchange further includes a controller for establishing hunt groups for forwarding messages to appropriate ones of the back-end multimedia messaging exchanges based on the subscriber list information.

12. A cluster according to claim 1, wherein the at least one back-end multimedia messaging exchange communicates the multimedia messages to the network exchange over voice trunks identified by virtual channels issued only by the front-end multimedia messaging exchanges and not by the network exchange.

13. A cluster according to claim 10, wherein each back-end exchange includes mutually exclusive corresponding multimedia interfaces connected by voice trunks to the network exchange.

14. A method of clustering multimedia messaging systems in communication with a telecommunications network via real network channels, comprising the steps of:

generating a multimedia message at a back-end multimedia messaging exchange;

communicating a virtual channel from a front-end messaging exchange to the back-end messaging exchange;

communicating the multimedia message from the back-end messaging exchange to a network exchange on the virtual channel;

communicating a cross-connect signal from the frontend messaging exchange to the network exchange identifying a translation from the virtual channel to a real network channel;

crossing the multimedia message to the real network channel using the identified cross-connect signal; and communicating the multimedia message to the telecommunications network on the real network channel.

15. A method according to claim 14, further comprising the steps of:

communicating a subscriber list from the back-end multimedia messaging exchange to the front-end multimedia messaging exchange, and loading the subscriber list into a lookup table at the front-end multimedia messaging exchange for use in generating said cross-connect signal.

16. A method according to claim 14, wherein multimedia messages are generated at a plurality of back-end multimedia messaging exchanges each of which receives said virtual channel communications and communicates said messages on respective ones of said virtual channels to the network exchange.

17. A method of communicating with a telecommunications network using multiple clusters of multimedia messaging exchanges, comprising the steps of:

providing a first network exchange in communication with the telecommunications network over real network channels;

providing first redundant front end multimedia messaging exchanges in communication with the first network exchange via real network channel signal links;

providing a second network exchange in communication with the telephonic communications network over real network channels;

providing second redundant front end multimedia messaging exchanges in communication with the second network exchange via real network channel signal links;

providing a central multimedia messaging exchange;

providing a plurality of back-end messaging exchanges each in communication with both the first and second network exchanges over trunk lines and each in communication with the central multimedia messaging exchange;

communicating virtual channel identifiers from the central multimedia messaging exchange to the back-end messaging exchanges on which said back-end messaging exchanges communicate messages over said trunk lines to at least one of the first and second network exchanges;

communicating translation signals to the first and second network exchanges to transfer the messages received on said trunk lines from the virtual channels to the real network channels; and communicating the messages from the network exchanges to the telecommunications network over the real network channels.

18. Multiple clusters of multimedia messaging exchanges for communicating with a telecommunications network, comprising:

a first network exchange in communication with the telecommunications network over real network channels;

first redundant front end multimedia messaging exchanges in communication with the first network exchange via real network channel signaling links;

a second network exchange in communication with the telecommunications network over real network channels;

second redundant front end multimedia messaging exchanges in communication with the second network exchange via real network channel signal links;

a central multimedia messaging exchange;

a plurality of back-end messaging exchanges each in communication with both the first and second network exchanges over trunk lines and each in communication with the central multimedia messaging exchange;

wherein the central multimedia messaging exchange communicates virtual channel identifiers to the back-end messaging exchanges on which said back-end messaging exchanges communicate messages over said trunk lines to at least one of the first and second network exchanges, and wherein the first and second network exchanges communicate cross-connect signals to the network exchange for transferring the messages received on said trunk lines from virtual channels corresponding to the virtual channel identifiers to the real network channels, and wherein the network exchanges communicate the messages from the trunk lines to the telecommunications network over the real network channels.

19. Multiple clusters according to claim 18, wherein the first and second redundant front-end multimedia messaging exchanges include virtual line exchange modules in a one-to-one correspondence with the plurality of back-end multimedia message exchanges, said virtual line exchange modules for communicating virtual channel switching signals to the corresponding back-end multimedia messaging exchanges.

20. Multiple clusters according to claim 19, wherein the virtual line exchange module communicates with a corresponding network circuit switching module located in the corresponding back-end multimedia exchanges.

21. Multiple clusters according to claim 20, wherein the network circuit switching module operates under the same software image whether in the cluster or in a stand-alone mode of the corresponding back-end multimedia messaging exchange.

22. Multiple clusters according to claim 21, wherein the virtual channel switching signals also carry subscriber list information from the back-end multimedia messaging exchanges to the corresponding virtual line exchange modules.

23. Multiple clusters according to claim 20 wherein each pair of 1) virtual line exchange module and 2) corresponding network circuit switching module are assigned a predetermined group of said virtual channels.

24. Multiple clusters according to claim 23, wherein any virtual line exchange can assign virtual channels to a corresponding network circuit switching module only from its assigned group of virtual channels.

25. Multiple clusters according to claim 22, wherein the front-end multimedia messaging exchange specifies the channel cross-connect signals for the respective subscribers identified by the subscriber list information.

26. Multiple clusters according to claim 20, wherein each network circuit switching module is a standard multimedia channel interface software module employed in a stand-alone operation of the corresponding back-end multimedia messaging exchange.

27. Multiple clusters according to claim 18, wherein the plurality of back-end exchanges provide the multimedia messages to the first and second network exchanges via standard multimedia interfaces.

28. Multiple clusters according to claim 22, wherein the first and second front-end multimedia messaging exchanges further include a controller for establishing hunt groups for forwarding messages to appropriate ones of the plurality of back-end multimedia messaging exchanges based on the subscriber list information.

29. Multiple clusters according to claim 18, wherein the plurality of back-end multimedia messaging exchanges communicate the multimedia messages to the network exchange over voice trunks identified by virtual channels issued only by the first and second redundant front-end multimedia messaging exchanges and not by the first and second network exchanges.

30. Multiple clusters according to claim 27, wherein each back-end exchange includes mutually exclusive corresponding multimedia interfaces connected by voice trunks to the first and second network exchanges.

* * * * *